United States Patent
Manula et al.

(10) Patent No.: US 8,804,752 B2
(45) Date of Patent: Aug. 12, 2014

(54) METHOD AND SYSTEM FOR TEMPORARY DATA UNIT STORAGE ON INFINIBAND HOST CHANNEL ADAPTOR

(75) Inventors: Brian Edward Manula, Oslo (NO); Magne Vigulf Sandven, Ski (NO); Haakon Ording Bugge, Oslo (NO)

(73) Assignee: Oracle International Corporation, Redwood Shores, CA (US)

( * ) Notice: Subject to any disclaimer, the term of this patent is extended or adjusted under 35 U.S.C. 154(b) by 665 days.

(21) Appl. No.: 13/149,483

(22) Filed: May 31, 2011

(65) Prior Publication Data

US 2012/0307838 A1    Dec. 6, 2012

(51) Int. Cl.
H04L 12/28 (2006.01)
H04L 12/54 (2013.01)
G06F 3/00 (2006.01)
G06F 13/00 (2006.01)
G06F 9/26 (2006.01)

(52) U.S. Cl.
USPC ........... 370/412; 370/419; 370/422; 370/428; 710/52; 711/118; 711/170; 711/202

(58) Field of Classification Search
None
See application file for complete search history.

(56) References Cited

U.S. PATENT DOCUMENTS

| | | | |
|---|---|---|---|
| 6,424,650 B1 * | 7/2002 | Yang et al. | 370/390 |
| 6,459,698 B1 | 10/2002 | Acharya | |
| 6,563,790 B1 | 5/2003 | Yu et al. | |
| 6,741,559 B1 | 5/2004 | Smeulders et al. | |
| 6,789,143 B2 | 9/2004 | Craddock et al. | |
| 6,917,987 B2 | 7/2005 | Parthasarathy et al. | |
| 7,136,353 B2 | 11/2006 | Ha et al. | |
| 7,330,918 B2 | 2/2008 | Yamamoto et al. | |
| 7,362,764 B2 * | 4/2008 | Johnsen et al. | 370/395.21 |
| 7,496,698 B2 | 2/2009 | Biran et al. | |
| 7,609,636 B1 | 10/2009 | Mott | |
| 7,724,746 B2 * | 5/2010 | Valtchev et al. | 370/392 |
| 7,742,497 B2 | 6/2010 | Ganti et al. | |
| 7,769,015 B2 | 8/2010 | Huang et al. | |
| 7,782,805 B1 | 8/2010 | Belhadj et al. | |
| 7,787,366 B2 | 8/2010 | Cuffaro et al. | |
| 7,817,634 B2 | 10/2010 | Coffman et al. | |
| 7,830,919 B1 | 11/2010 | Thompson | |
| 7,899,050 B2 | 3/2011 | Craddock et al. | |

(Continued)

OTHER PUBLICATIONS

Pfister, Gregory; "An Introduction to the Infiniband Architecture"; IBM Enterprise Server Group, Chapter 42, pp. 617-632 (2002).

(Continued)

Primary Examiner — Hassan Phillips
Assistant Examiner — Hicham Foud
(74) Attorney, Agent, or Firm — Osha Liang LLP

(57) ABSTRACT

A method for temporary storage of data units including receiving a first data unit to store in a hardware linked list queue on a communications adapter, reading a first index value from the first data unit, determining that the first index value does match an existing index value of a first linked list, and storing the first data unit in the hardware linked list queue as a member of the first linked list. The method further includes receiving a second data unit, reading a second index value from the second data unit, determining that the second index value does not match any existing index value, allocating space in the hardware linked list queue for a second linked list, and storing the second data unit in the second linked list.

20 Claims, 13 Drawing Sheets

(56) References Cited

U.S. PATENT DOCUMENTS

| | | | |
|---|---|---|---|
| 7,953,854 B2 * | 5/2011 | Elnozahy et al. | 709/225 |
| 8,244,946 B2 | 8/2012 | Gupta et al. | |
| 8,255,475 B2 | 8/2012 | Kagan et al. | |
| 8,259,576 B2 | 9/2012 | Lee et al. | |
| 8,259,746 B2 | 9/2012 | Lo et al. | |
| 8,274,976 B2 | 9/2012 | Aloni et al. | |
| 8,296,386 B1 | 10/2012 | Micalizzi, Jr. | |
| 2001/0036185 A1 | 11/2001 | Dempo | |
| 2003/0101158 A1 | 5/2003 | Pinto et al. | |
| 2003/0174709 A1 * | 9/2003 | Shankar | 370/395.31 |
| 2005/0018669 A1 | 1/2005 | Arndt et al. | |
| 2005/0060443 A1 * | 3/2005 | Rosner | 710/33 |
| 2005/0135419 A1 | 6/2005 | Pullen et al. | |
| 2005/0223118 A1 | 10/2005 | Tucker et al. | |
| 2007/0008886 A1 | 1/2007 | Chen et al. | |
| 2007/0019665 A1 | 1/2007 | Benveniste | |
| 2007/0110055 A1 * | 5/2007 | Fischer et al. | 370/389 |
| 2007/0165672 A1 | 7/2007 | Keels et al. | |
| 2007/0223472 A1 | 9/2007 | Tachibana et al. | |
| 2007/0223483 A1 | 9/2007 | Huang et al. | |
| 2007/0242686 A1 | 10/2007 | Zegers et al. | |
| 2008/0140984 A1 | 6/2008 | Shearer | |
| 2008/0168194 A1 | 7/2008 | Gregg et al. | |
| 2008/0270726 A1 * | 10/2008 | Elnozahy et al. | 711/165 |
| 2009/0106470 A1 * | 4/2009 | Sharma et al. | 710/301 |
| 2009/0125604 A1 | 5/2009 | Chang et al. | |
| 2009/0144383 A1 * | 6/2009 | Elnozahy et al. | 709/206 |
| 2010/0095064 A1 * | 4/2010 | Aviles | 711/118 |
| 2011/0216648 A1 | 9/2011 | Mehrotra et al. | |
| 2012/0239832 A1 | 9/2012 | Subramanian et al. | |
| 2013/0132675 A1 * | 5/2013 | Sleiman et al. | 711/122 |

OTHER PUBLICATIONS

Shanley, Tom; "Infiniband Network Architecture", MindShare, Inc., Chapter 1, pp. 9-24 (2003).

Shanley, Tom; "Infiniband Network Architecture", MindShare, Inc., Chapters 3-6, pp. 31-129 (2003).

Shanley, Tom; "Infiniband Network Architecture", MindShare, Inc., Chapter 13, pp. 259-289 (2003).

* cited by examiner

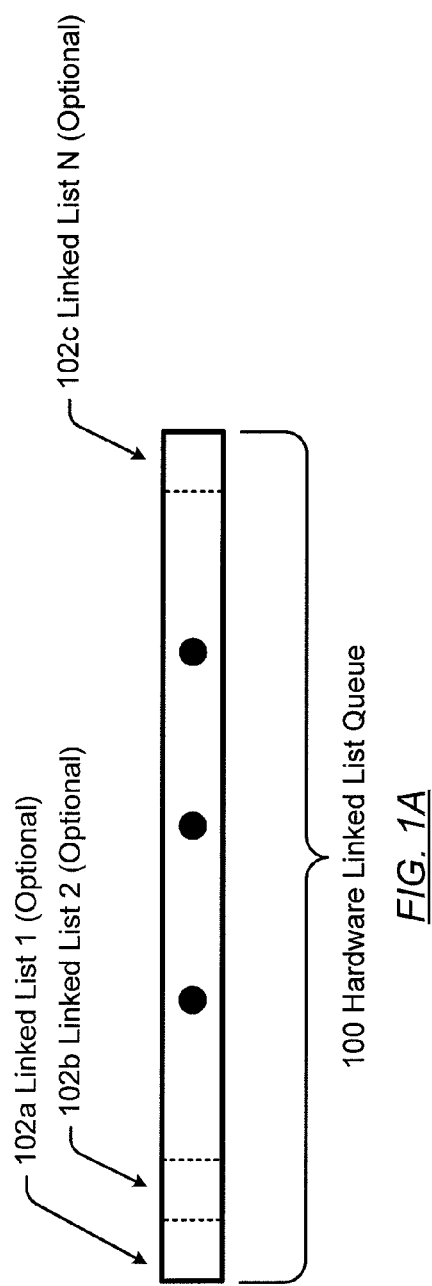
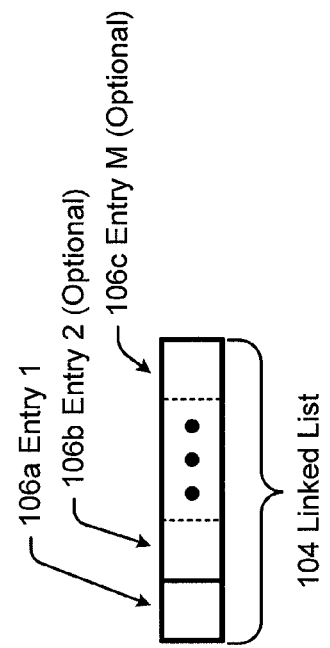

METHOD AND SYSTEM FOR TEMPORARY DATA UNIT STORAGE ON INFINIBAND HOST CHANNEL ADAPTOR

CROSS-REFERENCE TO RELATED APPLICATIONS

The present application contains subject matter that may be related to the subject matter in the following U.S. patent applications, which are both assigned to a common assignee and are both incorporated by reference in their entirety: U.S patent application Ser. No. 13/149,449 entitled, "Method and System for Infiniband® Host Channel Adapter Quality of Service," filed on May 31, 2011, and now issued as U.S. Pat. No. 8,484,392; and U.S. patent application Ser. No. 13/149,436 entitled, "Method and System for Processing Commands on an Infiniband® Host Channel Adapter," filed on May 31, 2011, and now issued as U.S. Pat. No. 8,589,610.

BACKGROUND

The Infiniband® network includes nodes that communicate through a channel-based switched fabric (Infiniband® is a registered trademark of Infiniband Trade Association, located in Beaverton, Oreg.). For example, the nodes may be a host, an input/output subsystem, or a router which connects to another network. The switched fabric is made of a collection of switches, routers, and links that connect a set of channel adapters. The channel adapters form an interface between the switched fabric and the nodes. The channel adapter of the host is referred to as a host channel adapter. The channel adapter of an I/O subsystem is referred to as a target channel adapter.

In Infiniband®, two processes communicate using a queue pair. A queue pair includes a send queue and a receive queue. Specifically, in order for a process to send a message to another process, the process posts the message to the send queue. The host channel adapter sends the message in the form of packets to the channel adapter having the receive queue. Each packet that is sent may include a packet sequence number. Logic associated with the receive queue ensures that packets are processed in a particular order using the packet sequence number.

Infiniband® supports operations such as remote direct memory access (RDMA) read and write operation. Specifically, a requested process may send a request in the message for the receiver to store data and/or return data. In response, the remote node's channel adapter includes functionality to store and/or return the requested data to the requesting process.

SUMMARY

In general, in one aspect, the invention relates to a method for temporary storage of data units on a communications adapter. The method includes receiving a first data unit to store in a hardware linked list queue on the communications adapter, reading a first index value from the first data unit, determining that the first index value does match an existing index value of a first linked list of the plurality of linked lists in the hardware linked list queue, and storing the first data unit in the hardware linked list queue as a member of the first linked list. The method further includes receiving a second data unit to store in the hardware linked list queue on the communications adapter, reading a second index value from the second data unit, determining that the second index value does not match any existing index value of any of the plurality of linked lists stored in the hardware linked list queue, allocating space in the hardware linked list queue for a second linked list to add the second linked list to the plurality of linked lists based on determining that the second index value does not match any existing index value, and storing the second data unit in the second linked list. The method further includes, for each transmission request on the hardware linked list queue, identifying a list identifier in the transmission request, identifying a head pointer of a requested linked list of the plurality of linked lists that matches the list identifier in the transmission request, obtaining, from the hardware linked list queue, a requested data unit referenced by the head pointer, and transmitting the requested data unit.

In general, in one aspect, the invention relates to a hardware linked list queue for temporary storage of data units on a communications adapter. The hardware linked list queue includes a data list component that includes a data memory comprising memory locations for storing a linked lists, wherein each linked list comprises at least one data unit. The data list component further includes a data list memory that includes a free list for storing a list of available memory locations in the data memory, and a data unit list that includes list entries, where each list entry corresponds to a memory location of the plurality of memory locations, and where each list entry stores an identifier of a next list entry in a same linked list. The data list component further includes a data list controller for storing a head pointer for each list of the plurality of linked lists, wherein the head pointer references a first list entry in the data unit list. The hardware linked list queue further includes a management unit operatively connected to the data list component and configured to receive an inbound data unit, and send the list identifier corresponding to the inbound data unit to the data list controller to associate the inbound data unit with the linked list corresponding to the inbound data unit. The data list component is configured, for each transmission request of a plurality of transmission requests, to identify a list identifier in the transmission request, identify the head pointer of a requested linked list of the plurality of linked lists that matches the list identifier in the transmission request, obtain, from the data memory, a requested data unit referenced by the head pointer, and transmit the requested data unit.

In general, in one aspect, the invention relates to a communications adapter that includes a producer module, a consumer module, and a current module interposed between the producer module and the consumer module. The current module is configured to receive, from the producer module, a first data unit to store in a hardware linked list queue on the communications adapter, read a first index value from the first data unit, determine that the first index value does match an existing index value of a first linked list of the plurality of linked lists having data units, and store the first data unit in the hardware linked list queue as a member of the first linked list. The current module further includes functionality to receive, from the producer module, a second data unit to store in the hardware linked list queue on the communications adapter, read a second index value from the second data unit, determine that the second index value does not match any existing index value of any of the plurality of linked lists stored in the hardware linked list queue, allocate space in the hardware linked list queue for a second linked list to add the second linked list to the plurality of linked lists based on determining that the second index value does not match any existing index value, and store the second data unit in the second linked list. The current module further includes functionality to, for each transmission request on the hardware linked list queue, identify a list identifier in the transmission request, identify a head pointer of a requested linked list of the plurality of linked lists that matches the list identifier in the transmission request, obtain, from the hardware linked list queue, a requested data unit referenced by the head pointer, and transmit, to the consumer module, the requested data unit.

Other aspects of the invention will be apparent from the following description and the appended claims.

BRIEF DESCRIPTION OF DRAWINGS

FIGS. 1-5 show conceptual and schematic diagrams in one or more embodiments of the invention.

DETAILED DESCRIPTION

Figure 2:
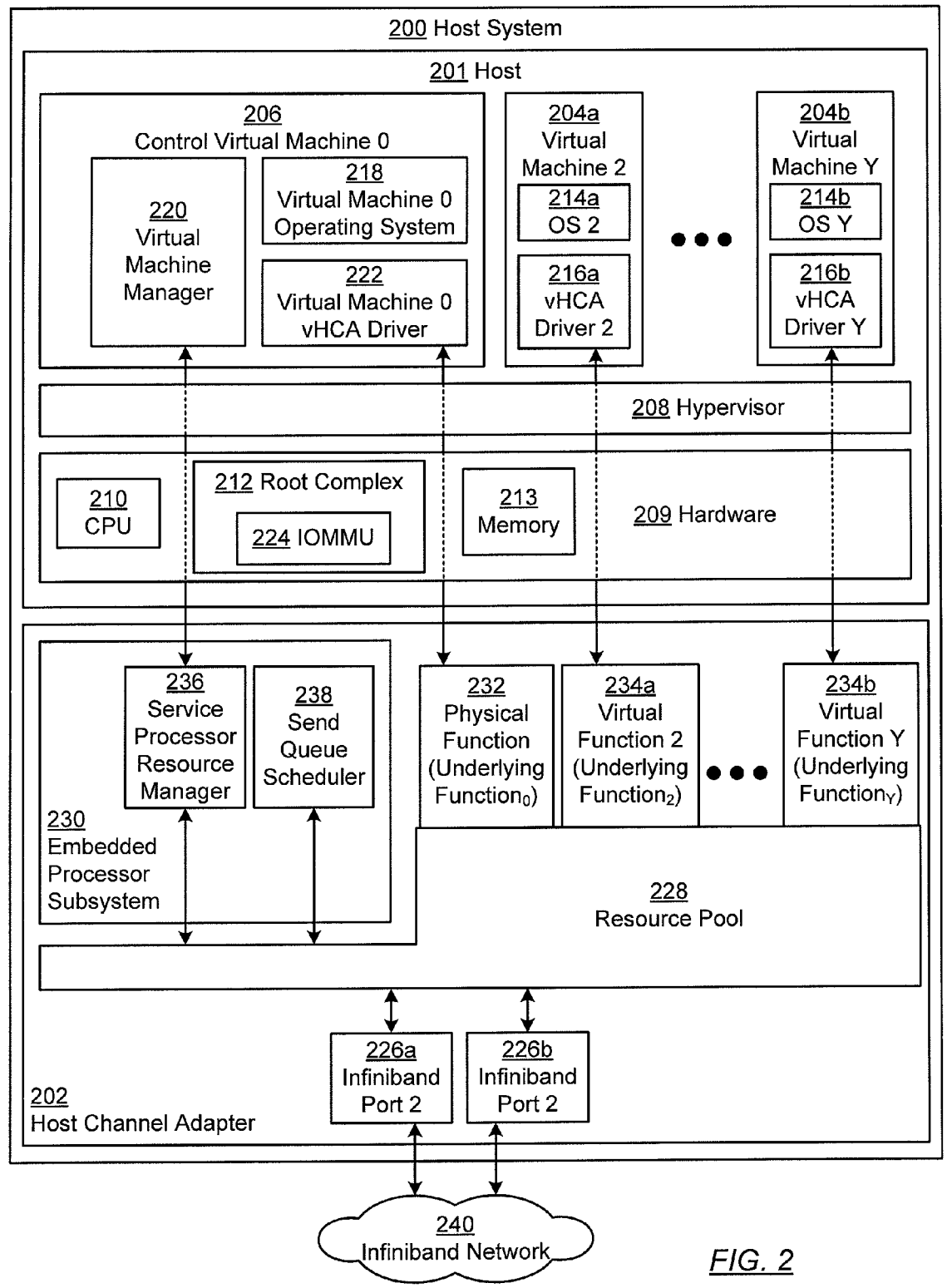

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for supporting multiple linked lists in a single hardware linked list queue on a communications adapter. Specifically, the hardware linked list queue corresponds to a hardware component that is configured to store multiple linked lists and individually manage the stored linked lists. For example, when a new data unit is received for the hardware linked list queue, the hardware linked list queue determines whether a linked list corresponding to the new data unit exists in the hardware linked list queue, adds a new linked list when the linked list does not exist, and stores the data unit in the hardware linked list queue. Further, in one or more embodiments of the invention, the hardware linked list queue includes functionality to individually manage each linked list. Specifically, data units in each linked list are processed in order of receipt. Additionally, data units in different linked list may be processed out of order of receipt.

In one or more embodiments of the invention, a communications adapter is a hardware device that is configured to connect a host to a network. For example, the communications adapter may correspond to a channel adapter for connecting a host or target system to an Infiniband® network. In such a scenario, the communications adapter may correspond to a host channel adapter or a target channel adapter. Other types of communications adapters may be used without departing from the invention.

FIGS. 1A-1B shows a conceptual diagram of a hardware linked list queue (100) in one or more embodiments of the invention. In one or more embodiments of the invention, the hardware linked list queue (100) corresponds to hardware and/or firmware for managing and storing the linked lists (e.g., linked list 1 (102a), linked list 2 (102b), linked list N (102c)). Specifically, as shown in the conceptual diagram of FIG. 1A, the hardware linked list queue (100) may include multiple linked lists (e.g., linked list 1 (102a), linked list 2 (102b), linked list N (102c)).

FIG. 1B shows a linked list (104) in one or more embodiments of the invention. As shown in FIG. 1B, each linked list (104) includes one or more entries (e.g., entry 1 (106a), entry 2 (106b), entry N (106c)). Each entry is configured to store a data unit. In one or more embodiments of the invention, a data unit corresponds to data used to process commands on the host channel adapter.

In one or more embodiments of the invention, as shown in FIG. 1B, the first entry of the linked list may not be optional while subsequent entries of the linked list are optional. Specifically, for a linked list to exist, the linked list may be required to have at least one entry in some embodiments of the invention. In alternative embodiments, the linked list is not required to have an entry. In one or more embodiments of the invention, entries in the linked list are ordered. The ordering of the entries may be, for example, a first in first out order. In other words, entries are removed from the linked list in the order that the entries were received in the linked list.

Returning to FIG. 1A, in one or more embodiments of the invention, the number of linked lists and the size of each linked list dynamically adjusts in the hardware linked list queue. For example, at any particular moment in time, the hardware linked list queue (100) may have zero linked lists up to N linked lists, where N is the maximum number of entries in the hardware linked list queue. In the scenario in which the hardware linked list queue has N entries, each linked list has only a single entry. Further, in one or more embodiments of the invention, the hardware linked list queue (100) includes functionality to process data units in different linked lists out of order.

For example, consider the scenario in which the hardware linked list queue includes a first linked list and a second linked list. Further, consider the scenario in which the first data unit for the first linked list arrived before the first data unit for the second linked list. Because the first data unit for the first linked list arrived before the first data unit for the second linked list, the first linked list is allocated before the second linked list. Further, in the example, the first linked list and the second linked list each have two entries. The first entry of the first linked list requires additional time in processing, while the second entry of the first linked list is immediately ready. Both entries of the second linked list are immediately ready. In the example, the hardware linked list queue includes functionality to forward both entries of the second linked list immediately and in order with respect to each other even though the first entry of the first linked list is allocated prior to the first entry of the second linked list. Further, the hardware linked list queue includes functionality to hold the second entry of the first linked list because the first entry is not ready for forwarding.

Although FIG. 1A show linked lists as being allocated as consecutive entries in the hardware linked list queue, the entries allocated to a linked list may not be consecutive in one or more embodiments of the invention. In particular, entries of different linked lists may be intermixed without departing from the invention. Further, although FIG. 1B shows entries stored in order, entries may not be stored in order in the hardware linked list queue.

As discussed above, the hardware linked list queue provides a tool for processing commands on a host channel adapter in a host system in one or more embodiments of the invention.

Figure 3:
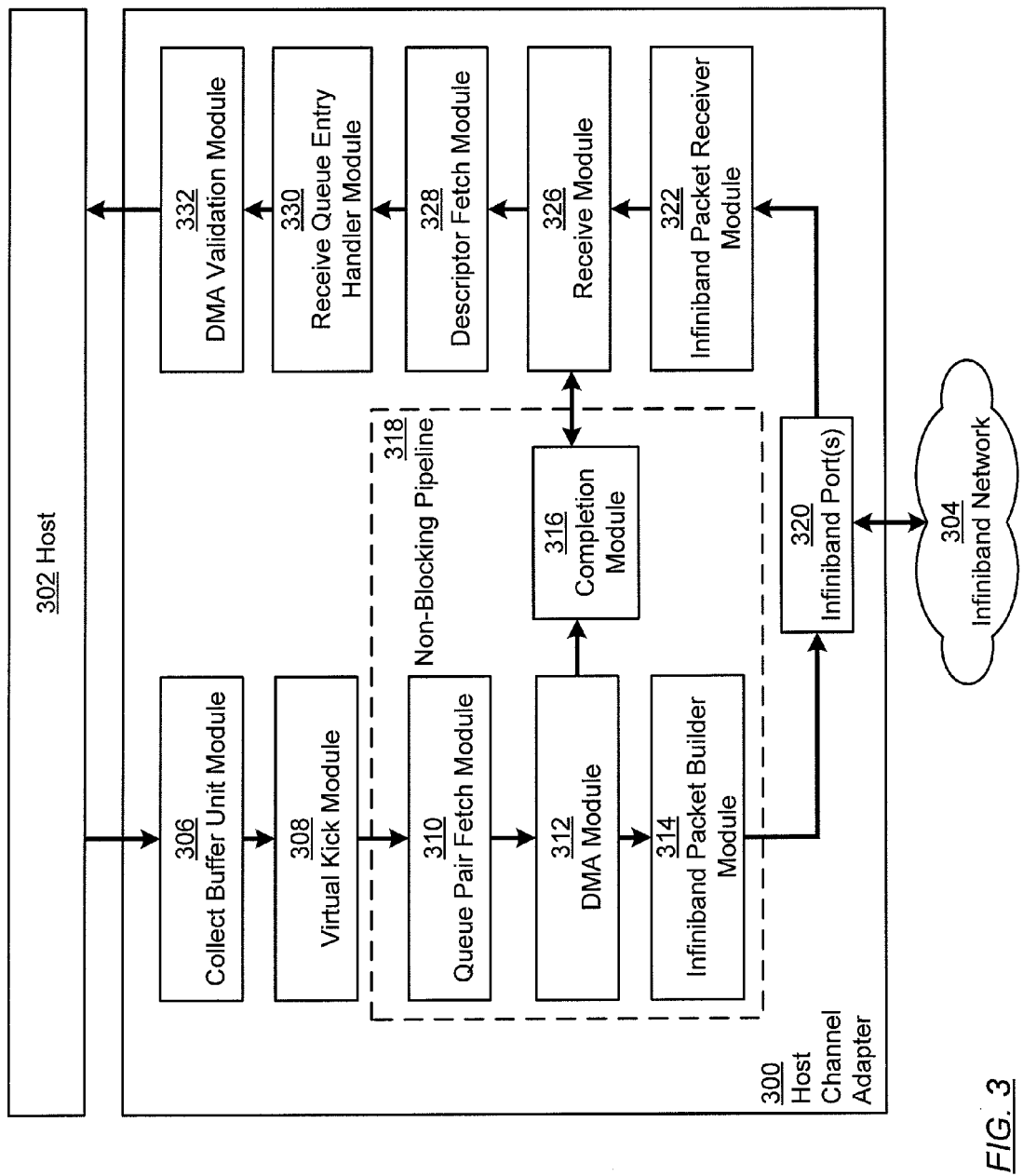
Figure 4:
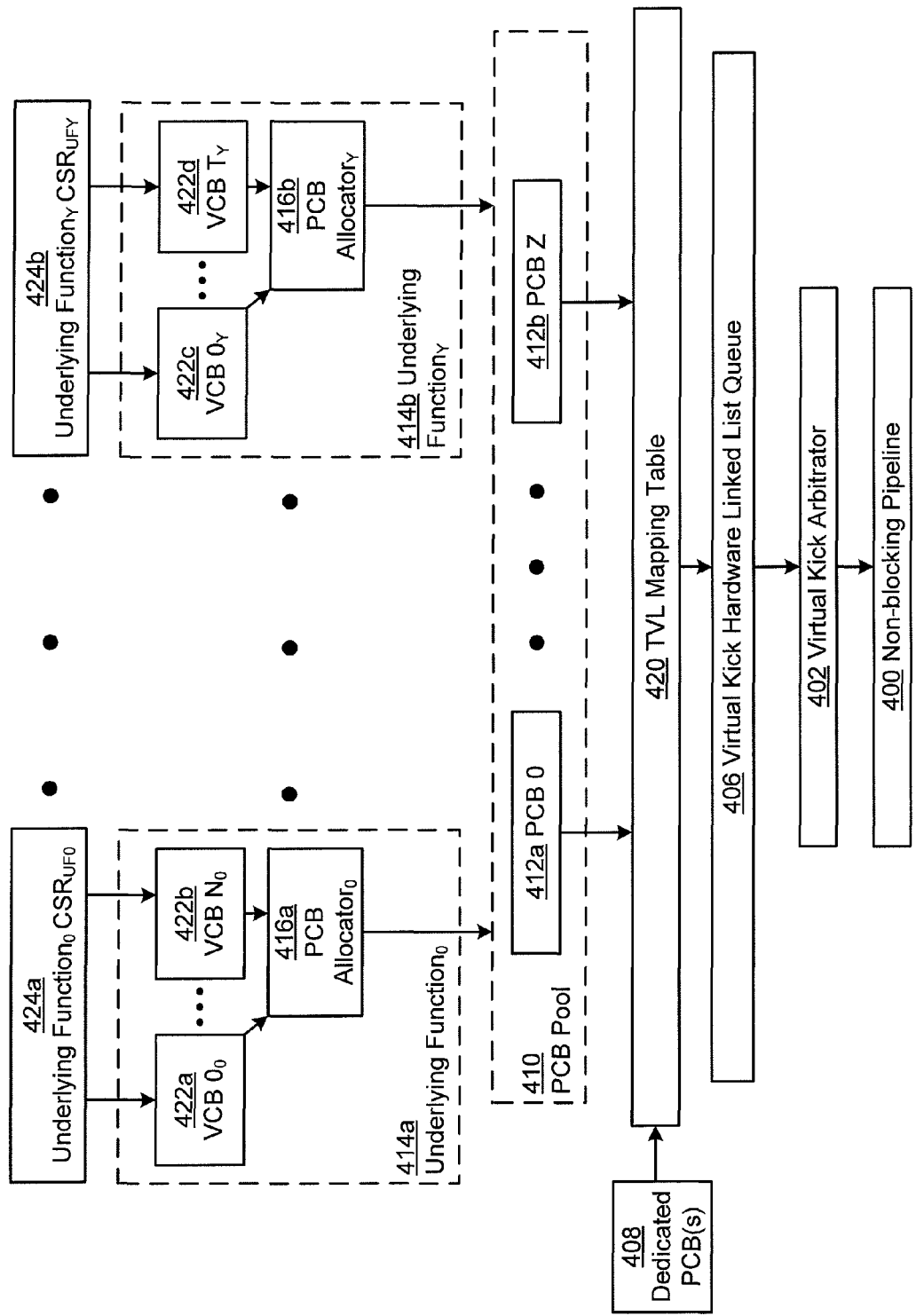

As discussed above, the hardware linked list queue may be included in any type of communications adapter. FIGS. 2-4 show schematic diagrams when the communications adapter is a host channel adapter in one or more embodiments of the invention. FIG. 2 shows a schematic diagram of a host system (200) in one or more embodiments of the invention. In one or more embodiments of the invention, the host system (200) is any physical computing device. Specifically, the host system (200) includes at least a minimum amount of hardware necessary to process instructions. As shown in FIG. 2, the host system (200) includes a host (201) and a host channel adapter (202) in one or more embodiments of the invention. These components are discussed below.

In one or more embodiments of the invention, the host (201) includes one or more guest virtual machines (e.g., virtual machine 1 (204*a*), virtual machine Y (204*b*)), a control virtual machine (206), a hypervisor (208), and a root complex (212). Each of these components is discussed below.

Broadly speaking, the virtual machines (e.g., virtual machine 1 (204*a*), virtual machine Y (204*b*), control virtual machine (206)) are distinct operating environments configured to inherit underlying functionality of the host operating system via an abstraction layer. In one or more embodiments of the invention, each virtual machine includes a separate instance of an operating system (e.g., OS 1 (214*a*), OS Y (214*b*)) (OS in FIG. 2). The separate instances of the operating system may be the same type of operating system or different types of operating systems.

Specifically, the guest virtual machine operating system (e.g., OS 1 (214*a*), OS Y (214*b*)) operates as if the guest virtual machine operating system is the only operating system on the host (201) and the resources (e.g., processor cycles, memory, resources of the host channel adapter) allocated to the guest virtual machine are the only resources available on the host (201). Thus, the guest virtual machine operating system (e.g., OS 1 (214*a*), OS Y (214*b*)) includes functionality to control the operating environment of applications executing in the guest virtual machine using resource allocated to the guest virtual machine Each virtual machine may be allocated disjoint or non-overlapping physical memory (213).

Many different types of virtual machines exist. For example, the Xen® virtualization project allows for multiple guest operating systems executing in a host operating system. Xen® is a trademark overseen by the Xen Project Advisory Board. In one embodiment of the invention, the host operating system supports virtual execution environments (not shown). Another example is a Solaris™ Container. In such cases, the Solaris™ Container may execute in the host operating system, which may be a Solaris™ operating system. Solaris™ is a trademark of Oracle America, Inc. In one embodiment of the invention, the host operating system may include both virtual machines and virtual execution environments.

In one or more embodiments of the invention, the guest virtual machine includes a virtual host channel adapter device driver (e.g., vHCA driver 1 (216*a*), vHCA driver Y (216*b*)). The virtual host channel adapter device driver is software program that provides an interface to host channel adapter (202) for the guest virtual machine operating system. Specifically, when the guest virtual machine operating system wants to send commands to the host channel adapter (202), the virtual machine operating system invokes a routine in the virtual host channel adapter device driver. In response, the virtual host channel adapter device driver issues commands to a virtualized device controller (not shown) presented by the hypervisor (208) (discussed below). In turn, the hypervisor (208) includes functionality to transmit the message to the host channel adapter (202).

In addition to the guest virtual machine (e.g., virtual machine 1 (204*a*), virtual machine Y (204*b*)), the host (201) also includes a control virtual machine (206). In one or more embodiments of the invention, the control virtual machine (206) has a separate address space and operating system environment than the guest virtual machine (e.g., virtual machine 1 (204*a*), virtual machine Y (204*b*)). The control virtual machine (206) includes a control virtual machine operating system (218), a control virtual machine manager (220), and a virtual machine host channel adapter device driver (222). The virtual machine host channel adapter device driver (222) includes functionality similar to the guest virtual machine host channel adapter device drivers (e.g., vHCA driver 1 (216*a*), vHCA driver Y (216*b*)) discussed above. The host virtual machine operating system (218) includes functionality to provide an operating environment for software executing in the control virtual machine (206).

In one or more embodiments of the invention, the software executing in the control virtual machine (206) includes a virtual machine manager (220) (discussed below). In one or more embodiments of the invention, the virtual machine manager (220) includes functionality to configure the hypervisor (208), configure the host channel adapter (202), create, remove, and configure guest virtual machines, and perform the management of the host (201). With regards to configuring the host channel adapter, the virtual machine manager includes functionality to send commands to the host channel adapter to adjust the number of resources allocated to each virtual machine To receive parameter values for performing the above management tasks, the virtual machine manager (220) may include a user interface and/or an application programming interface for communicating with a computer administrator or another program in one or more embodiments of the invention.

Continuing with FIG. 2, the hypervisor (208) includes functionality to control the sharing of hardware resources on the host (201). Specifically, the hypervisor (208) includes functionality to virtualize the physical devices of the host (201) so that more than one operating system may share the same physical device transparently in accordance with one or more embodiments of the invention. Further, the hypervisor (208) controls when the guest virtual machine (e.g., virtual machine 1 (204*a*), virtual machine Y (204*b*)) and the control virtual machine (206) are allowed to execute. For example, the hypervisor (208) may be a thin-privileged layer of software that only manages which guest virtual machine or the host virtual machine (206) is executing.

Continuing with the host, the host (201) includes hardware (209). The hardware (209) may include, for example, a central processing unit (210), memory (213), and a root complex (212). In one or more embodiments of the invention, the CPU (210) is a hardware processor component for processing instructions of the host. The CPU (210) may include multiple hardware processors. Alternatively or additionally, each hardware processor may include multiple processing cores in one or more embodiments of the invention. In general, the CPU (210) is any device configured to execute instructions on the host (201).

In one or more embodiments of the invention, the memory (213) is any type of hardware device for storage of data. In one or more embodiments of the invention, the memory (213) may be partitioned on a per-virtual machine basis, such that each virtual machine (e.g., control virtual machine (206), virtual machine 1 (204*a*), virtual machine Y (204*b*)) is allocated separate and distinct memory. In one or more embodiments of the invention, the memory (213) includes functionality to store a send queue (not shown).

A separate send queue may be stored in memory for each virtual machine Alternatively or additionally, multiple virtual machines may share one or more send queues. In one or more embodiments of the invention, a send queue includes functionality to store an ordered list of command identifiers for commands for processing by the host channel adapter (202). In one or more embodiments of the invention, the command identifiers may be the actual commands and/or references to the commands.

In one or more embodiments of the invention, the root complex (212) includes functionality to connect the CPU and memory subsystem to a peripheral component interconnect (PCI) Express switch fabric. Specifically, in one or more embodiments of the invention, the root complex (212) connects the host (201) to the host channel adapter (202). Although FIG. 2 shows the root complex (212) as separate from the CPU (210), the root complex (212) may be integrated as part of the CPU.

The root complex (212) includes an input/output memory management unit (IOMMU) (224) in one or more embodiments of the invention. The IOMMU (224) includes functionality to connect a direct memory access (DMA) input/output (I/O) bus to the memory. In one or more embodiments of the invention, the IOMMU (224) includes functionality to translate device virtual addresses to physical addresses of memory on the host (201).

Continuing with FIG. 2, the host (201) is connected to the host channel adapter (202). In one or more embodiments of the invention, the connection between the host (201) and the host channel adapter (202) may be a PCI express connection. Specifically, the host channel adapter may connect to a PCI express fabric connector on the host.

In one or more embodiments of the invention, the host channel adapter (202) is a hardware device configured to connect the host (201) to the Infiniband® network (240). Specifically, the host channel adapter (202) includes functionality to receive commands from the host (201) and process the commands. Processing the commands may include performing DMA with host memory to obtain and store packet data and to obtain control information, performing any validation required on the packet data, generating packets from the packet data, and sending and receiving packets on the Infiniband® network (240). FIG. 2 shows a schematic diagram of the host channel adapter (202) from the prospective of the host (201). As shown in FIG. 2, the host channel adapter (202) includes at least one Infiniband® port (e g., Infiniband® port 1 (226a), Infiniband® port 2 (226b)), a resource pool (228), and an embedded processor subsystem (230). Each of the components of the host channel adapter is discussed below.

In one or more embodiments of the invention, an Infiniband® port (e.g., Infiniband® port 1 (226a), Infiniband® port 2 (226b)) is a physical interface connector between the host channel adapter (202) and the Infiniband® network (240). Although FIG. 2 shows two Infiniband® ports, more or fewer ports may exist without departing from the invention.

The resource pool (228) is a collection of resources that are required to send and receive packets on the Infiniband® network. Specifically, the resource pool (228) corresponds to the collection of hardware and stored data that is shared by the virtual machines (e.g., control virtual machine (206), virtual machine 1 (204a), virtual machine Y (204b)). The resource pool (228) is discussed in FIG. 2 below.

In one or more embodiments of the invention, the sharing of the resource pool is performed using the concepts of physical function and virtual functions. A physical function (232) exposes the actual hardware of the host channel adapter (202) to an operating system. Specifically, by way of the physical function, the control virtual machine operating system (218) may control the host channel adapter. Thus, the physical function allows the control virtual machine (206) to control the host channel adapter (202), such as to disable the host channel adapter (202).

A virtual function (e.g., virtual function 1 (234a), virtual function Y (234b)) exposes a virtualized host channel adapter to a virtual machine Specifically, the virtual function (e.g., virtual function 1 (234a), virtual function Y (234b)) exposes to the virtual machine operating system only the partition of the resource pool allocated to the virtual machine To the guest virtual machine (e.g., virtual machine 1 (204a), virtual machine Y (204b)), the resources exposed by the virtual function (e.g., virtual function 1 (234a), virtual function Y (234b)) appear as if the resource are the only resources on the host channel adapter (202). Thus, the virtual function (e.g., virtual function 1 (234a), virtual function Y (234b)) allows the virtual machine operating system (e.g., OS 1 (214a), OS Y (214b)) to control the portion of resources allocated to the virtual machine In other words, a virtual function (e.g., virtual function 1 (234a), virtual function Y (234b)) provides the virtual machine operating system (e.g., OS 1 (214a), OS Y (214b)) the appearance that the virtual machine operating system (e.g., OS 1 (214a), OS Y (214b)) is controlling the host channel adapter (202) as a whole even though the actions of the virtual machine operating system (e.g., OS 1 (214a), OS Y (214b)) does not affect any other virtual function (e.g., virtual function 1 (234a), virtual function Y (234b)).

In one or more embodiments of the invention, the term, underlying function (UF), is used to generically refer to either a physical function or a virtual function. Specifically, as used herein, an underlying function may be a physical function or a virtual function.

The embedded processor subsystem (230) corresponds to an embedded processor and logic for managing the host channel adapter (202). The embedded processor subsystem includes a service processor resource manager (236) and a send queue scheduler (238). The service processor resource manager (236) includes functionality to receive and process the management commands on the host channels adapter. For example, the management commands may be to change the allocation of host channel adapter resources, change the configuration of the host channel adapter, and perform other management of the host channel adapter. With regards to resource allocation, the service processor resource manager includes functionality to change the allocation of the host channel adapter resources to underlying functions and change the allocation of the host channel adapter resources to QoS levels within the underlying functions.

Continuing with FIG. 2, the send queue scheduler (238) includes functionality to schedule commands identified in the send queue on the host channel adapter. Specifically, the send queue scheduler includes functionality to iterate through the send queue and store commands identified in the send queue on the host channel adapter (202).

As discussed above, FIG. 2 provides a general diagram of the host channel adapter (202) in one or more embodiments of the invention. FIG. 3 shows a schematic diagram of the resource pool of the host channel adapter (300) in one or more embodiments of the invention. As shown in FIG. 3, the host channel adapter (300) includes a collect buffer unit module (306), a virtual kick module (308), a queue pair fetch module (310), a direct memory access (DMA) module (312), an Infiniband® packet builder module (314), one or more Infiniband® ports (320), a completion module (316), an Infiniband® packet receiver module (322), a receive module (326), a descriptor fetch module (328), a receive queue entry handler module (330), and a DMA validation module (332). In one or more embodiments of the invention, each module may correspond to hardware and/or firmware. The dark arrows between modules show the transmission path of data units between modules as part of processing commands in one or more embodiments of the invention. Data units may have other transmission paths (not shown) without departing from the invention. Further, other communication channels and/or additional components of the host channel adapter (300) may exist without departing from the invention. Each of the components of the host channel adapter (300) is discussed below.

The collect buffer controller module (306) includes functionality to receive command data from the host and store the command data on the host channel adapter. The collect buffer controller module (306) is discussed below and in FIG. 4.

In one or more embodiments of the invention, the virtual kick module (308) includes functionality to load balance commands received from different underlying functions. Specifically, as discussed below with reference to FIG. 2, each command is assigned to a transmit virtual lane (TVL). Each transmit virtual lane (TVL) is allocated a number of execution credits and a number of completion credits in one or more embodiments of the invention. When a transmit virtual lane (TVL) has an execution credit and a completion credit available, a command assigned to the transmit virtual lane is ready for processing on the non-blocking pipeline (318). In one or more embodiments of the invention, the virtual kick module (308) includes a virtual kick hardware linked list queue (not shown) and an arbitrator (not shown). Each entry in the virtual hardware linked list queue is configured to store a data unit corresponding to the command. Specifically, in one or more embodiments of the invention, the data unit may include the command or an identifier of a physical collect buffer (PCB) (discussed below) that stores the command.

In one or more embodiments of the invention, the arbitrator is configured to process data units from the hardware linked list queue. Specifically, in one or more embodiments of the invention, the arbitrator is configured to determine whether the TVL to which the data unit is assigned has an execution credit and a completion credit available, and mark the data unit as ready when an execution credit and a completion credit are available.

Continuing with FIG. 3, the queue pair fetch module (310) includes functionality to obtain queue pair status information for the queue pair corresponding to the data unit. Specifically, a data unit may correspond to a command to send a message on the Infiniband® network. Per the Infiniband® protocol, the message has a corresponding send queue and a receive queue. The send queue and receive queue form a queue pair. Accordingly, the queue pair corresponding to the message is the queue pair corresponding to the data unit in one or more embodiments of the invention.

In one or more embodiments of the invention, the queue pair fetch module (310) includes a queue pair fetch hardware linked list queue (not shown), a queue pair state cache (not shown), and a queue pair fetch data unit processor (not shown). The queue pair fetch hardware linked list queue includes functionality to store data units until the queue pair state corresponding to the data unit is obtained and store data units waiting for transmission to a next module in one or more embodiments of the invention.

In one or more embodiments of the invention, the queue pair state cache corresponds to a cache for storing queue pair state entries corresponding to a portion of the queue pairs. Each queue pair state entry includes the queue pair state for a particular queue pair. In one or more embodiments of the invention, memory on the host (302) may store queue pair state entries for all queue pairs. The queue pair state information may include, for example, sequence number, address of remote receive queue/send queue, whether the queue pair is allowed to send or allowed to receive, and other state information.

In one or more embodiments of the invention, the queue pair fetch data unit processor includes functionality to determine whether the queue pair state entry corresponding to a data unit is in the queue pair state cache and obtain the queue pair state entry corresponding to the data unit from the queue pair state cache. Further, in one or more embodiments of the invention, the queue pair fetch data unit processor may further include functionality to perform DMA with host memory to obtain the queue pair state entry for the data unit from the host memory when the queue pair state entry is not in the queue pair state cache.

In one or more embodiments of the invention, the DMA module (312) includes functionality to perform DMA with host memory. In one or more embodiments of the invention, the DMA module includes a DMA data unit processor (not shown), DMA memory, and a DMA hardware linked list queue (not shown). The DMA data unit processor may include functionality to determine whether a command in a data unit or referenced by a data unit identifies a location in host memory that includes packet data. The DMA data unit processor may further include functionality to validate that the process sending the command has necessary permissions to access the location, and to obtain the packet data from the host memory, and store the packet data in the DMA memory. Specifically, the DMA memory corresponds to a storage unit for storing packet data obtained using DMA.

The DMA hardware linked list queue includes functionality to store entries and associate each entry with a linked list. Each entry in the DMA hardware linked list queue includes functionality to store a data unit waiting for a DMA or waiting for transmission to a next module. For example, when two commands are assigned to the same queue pair, then the packet data in the commands or referenced by the commands are processed in order of the issuance of the command to the host channel adapter (300). Thus, if the data unit corresponding to the first command issued to the host channel requires a DMA to obtain packet data while the data unit corresponding to the second command issued to the host channel does not require a DMA, then the data unit corresponding to the first command and the data unit corresponding to the second command may be stored in the DMA hardware linked list queue until, at least, the packet data for the first command is received.

Continuing with FIG. 3, in one or more embodiments of the invention, the DMA module (312) is connected to an Infiniband® packet builder module (314). In one or more embodiments of the invention, the Infiniband® packet builder module (314) includes an Infiniband® packet builder data unit processor (not shown) and an Infiniband® packet builder hardware linked list queue (not shown). Each entry in the Infiniband® packet builder hardware linked list queue includes functionality to store a data unit corresponding to a command waiting to have packets generated or waiting for transmission to a next module.

In one or more embodiments of the invention, the Infiniband® packet builder data unit processor includes functionality to generate one or more packets for each data unit in the Infiniband® packet builder hardware linked list queue, and to initiate transmission of the one or more packets on the Infiniband® network (304) via the Infiniband® port(s) (320).

In one or more embodiments of the invention, the Infiniband® packet builder data unit processor may include functionality to obtain the packet data from a PCB corresponding to the data unit, from the DMA memory, and from an embedded processor subsystem memory. In one or more embodiments of the invention, the Infiniband® packet builder data unit processor may include functionality to obtain header information for the packet(s) from the data unit.

Continuing with FIG. 3, in one or more embodiments of the invention, the completion module (316) includes functionality to manage packets for queue pairs set in reliable transmission mode. Specifically, in one or more embodiments of the invention, when a queue pair is in a reliable transmission mode, then the receiving channel adapter of a new packet responds to the new packet with an acknowledgement message indicating that transmission completed or an error message indicating that transmission failed. The completion module (316) includes functionality to manage data units corresponding to packets until an acknowledgement is received or transmission is deemed to have failed (e.g., by a timeout).

In one or more embodiments of the invention, the completion module (316) includes a completion hardware linked list queue (not shown) and a completion data unit processor (not shown). Each entry in the completion hardware linked list queue includes functionality to store a data unit corresponding to packet(s) waiting for an acknowledgement or a failed transmission or waiting for transmission to a next module. In one or more embodiments of the invention, the completion data unit processor includes functionality to determine when an acknowledgement message is received, an error message is received, or a transmission times out. Transmission may time out, for example, when a maximum transmission time elapses since sending a message and an acknowledgement message or an error message has not been received. The completion data unit processor further includes functionality to update the corresponding modules (e.g., the DMA module and the collect buffer module to retransmit the message or to free resources allocated to the command).

Continuing with FIG. 3, in one or more embodiments of the invention, the Infiniband® packet receiver module (322) includes functionality to receive packets from the Infiniband® port(s) (320). In one or more embodiments of the invention, the Infiniband® packet receiver module (322) includes functionality to perform a checksum to verify that the packet is correct, parse the headers of the received packets, and place the payload of the packet in memory. In one or more embodiments of the invention, the Infiniband® packet receiver module (322) includes functionality to obtain the queue pair state for each packet from a queue pair state cache. In one or more embodiments of the invention, the Infiniband® packet receiver module includes functionality to transmit a data unit for each packet to the receive module (326) for further processing.

In one or more embodiments of the invention, the receive module (326) includes functionality to validate the queue pair state obtained for the packet. In one or more embodiments of the invention, the receive module (326) includes a queue pair fetch hardware linked list queue (not shown) and a receive module data unit processor (not shown). Each entry in queue pair fetch hardware linked list queue includes functionality to store a data unit waiting for verifying the queue pair state information or waiting for transmission to a next module. The receive module data unit processor includes functionality to determine whether the packet should be accepted for processing. In one or more embodiments of the invention, if the packet corresponds to an acknowledgement or an error message for a packet sent by the host channel adapter (300), the receive module data unit processor includes functionality to update the completion module (316).

Additionally or alternatively, in one or more embodiments of the invention, the receive module (326) may include a receive module hardware linked list queue (not shown) and a buffer data unit processor (not shown). In one or more embodiments of the invention, the receive module hardware linked list queue includes functionality to store data units waiting for one or more reference to buffer location(s) or waiting for transmission to a next module. Specifically, when a process in a virtual machine is waiting for data associated with a queue pair, the process may create receive queue entries that reference one or more buffer locations in host memory in one or more embodiments of the invention. For each data unit in the receive module hardware linked list queue, the buffer data unit processor includes functionality to identify the receive queue entries from a host channel adapter cache or from host memory, and associate the identifiers of the receive queue entries with the data unit.

In one or more embodiments of the invention, the descriptor fetch module (328) includes functionality to obtain descriptors for processing a data unit. For example, the descriptor fetch module may include functionality to obtain descriptors for a receive queue, a shared receive queue, a ring buffer, and the completion queue.

In one or more embodiments of the invention, the receive queue entry handler module (330) includes functionality to obtain the contents of the receive queue entries. In one or more embodiments of the invention, the receive queue entry handler module (330) includes a receive queue entry hardware linked list queue (not shown) and a receive queue entry processor (not shown). Each entry in the receive queue entry hardware linked list queue includes functionality to store a data unit waiting for the buffer references in the corresponding receive queue or waiting for transmission to a next module. In one or more embodiments of the invention, the receive queue entry processor includes functionality to identify the location of the receive queue entry corresponding to the data unit and obtain the buffer references in the receive queue entry. In one or more embodiments of the invention, the receive queue entry may be located on a cache of the host channel adapter (300) or in host memory.

In one or more embodiments of the invention, the DMA validation module (332) includes functionality to perform DMA validation and initiate DMA with host memory. In one or more embodiments of the invention, the DMA validation module (332) includes a DMA validation hardware linked list queue (not shown) and a DMA validation data unit processor (not shown). Each entry in the DMA validation hardware linked list queue includes functionality to store a data unit waiting for DMA or waiting for transmission to a next module. The DMA validation processor includes functionality to confirm that the remote process that sent the packet has permission to write to the buffer(s) referenced by the buffer references, and confirm that the address and the size of the buffer(s) match the address and size of the memory region referenced in the packet. Further, in one or more embodiments of the invention, the DMA validation module (332) includes functionality to initiate DMA with host memory when the DMA is validated.

As shown in FIG. 3, each module receives data units from at least one other component and sends data units to at least one other component. The component from which a particular module receives data units is referred to as a producer in one or more embodiments of the invention. The component to which the particular module sends data units is referred to as a consumer in one or more embodiments of the invention. For example, with respect to the virtual kick module (308), the producer is the collect buffer unit module (306) and the consumer is the queue pair fetch module (310). With respect to the queue pair fetch module (310), the producer is the virtual kick module (308) and the consumer is the DMA module (312). With respect to the Infiniband® packet receiver module (322), the producer is the Infiniband® ports (320) and the consumer is the receive module (326). Thus, each module has at least one consumer and at least one producer in one or more embodiments of the invention.

FIG. 4 shows a schematic diagram of a portion of the resource pool for initiating processing of commands received from a host in one or more embodiments of the invention. FIG. 4 shows a schematic diagram of the resources of the host channel adapter and management components for the resources in one or more embodiments of the invention. Specifically, FIG. 4 shows components of the resource pool for transmission of messages on the Infiniband® network as shared between virtual machines and management components to manage the resource pool in one or more embodiments of the invention.

In general, the resource pool is configured to receive and execute commands from a virtual machine A command corresponds to an instruction to the host channel adapter. For example, a command may be an instruction to send a message on the Infiniband® network (not shown). A command includes command data in one or more embodiments of the invention. Specifically, command data corresponds to individual portions of the command.

When the command is an instruction to send a message on the Infiniband® network, the command may include the message itself or one or more addresses in the host memory having the message. The host channel adapter is configured to obtain the command, obtain the message from the command or from host memory referenced in the command, partition the message into packets if required, and send the packets on the Infiniband® network in accordance with an Infiniband® protocol. In one or more embodiments of the invention, the message is packet data. Specifically, packet data is data sent in the packets on the Infiniband® network. Thus, the packet data may be in the command or in the one or more addresses in host memory.

As shown in FIG. 4, the resource pool and the management components of the host channel adapter includes a non-blocking pipeline (400), a virtual kick arbitrator (402), transmit virtual lane (TVL) virtual kick hardware linked list queue (406), a mapping table (420), physical collect buffer (PCB) pool (410), dedicated PCBs (408), a PCB allocator (e.g., PCB Allocator$_0$ (416a), PCB Allocator$_Y$ (416b)), virtual collect buffers (VCBs) (e.g., VCB $0_0$ (422a), VCB $N_0$ (422b), VCB $0_Y$ (422c), VCB $T_Y$ (422d)), and underlying function CSRs (e.g., underlying function$_0$ CSR$_{UF0}$ (424a), underlying function$_Y$ CSR$_{UFY}$ (424b)). Each of these components is discussed below.

The non-blocking pipeline (400) corresponds to a set of hardware and firmware that includes functionality to process commands on the host channel adapter. Specifically, the non-blocking pipeline (400) includes functionality to obtain a command from a PCB (described below), obtain packet data based on the command data, verify the queue pair for sending the packet data, generate one or more packets having the packet data, and sending the packets on the Infiniband® network in accordance with the Infiniband® protocol. In one or more embodiments of the invention, the non-blocking pipeline (400) is partitioned into modules (not shown). Each module corresponds to hardware and/or firmware that includes functionality to perform a portion of the nonblocking pipeline. For example, one module may be configured to perform DMA with the host memory while another module may be configured to generate packets having the packet data.

In one or more embodiments of the invention, one of the modules includes a completion module. A completion module includes functionality to store messages in a completion linked list queue until an acknowledgement is received or transmission is deemed to have failed, such as by not receiving an acknowlegement within a predefined period of time. In one or more embodiments of the invention, the completion module is used when a queue pair is set in reliable transmission mode.

In one or more embodiments of the invention, the non-blocking pipeline is time shared amongst TVLs. In particular, a TVL is a time slice of the non-blocking pipeline. In other words, commands assigned to a TVL may be blocked by the execution through the pipeline of one or more other commands in the same TVL. In contrast to commands assigned to the same TVL, when a command is assigned to a different TVL, the command is not blocked by other commands in different TVLs.

In one or more embodiments of the invention, each TVL is associated with a virtual kick hardware linked list queue (406). A virtual kick hardware linked list queue (406) corresponds to a storage location for storing command identifiers of commands for which a kick has issued. A kick indicates that the command is ready for execution on the non-blocking pipeline (400). Specifically, in one or more embodiments of the invention, the kick indicates that the entirety of the command is stored on the host channel adapter. In one or more embodiments of the invention, the virtual kick hardware linked list queue includes functionality to store multiple linked lists. Each linked list in the virtual kick hardware linked list queue corresponds to a separate TVL. In one or more embodiments of the invention, commands are processed from each linked list in a first in first out (FIFO) order. In other words, the commands are processed in an order in which the commands are received to the linked list.

In one or more embodiments of the invention, the command identifier of the command may be the command, an address of a memory location having the command, or any other data that identifies the command. For example, the command identifier may be an address or identifier of the PCB (discussed below) having the command.

In one or more embodiments of the invention, a virtual kick arbitrator (402) is operatively interposed between the virtual kick hardware linked list queue (406) and the non-blocking pipeline (400) in one or more embodiments of the invention. In one or more embodiments of the invention, the virtual kick arbitrator includes functionality to arbitrate between TVLs having commands initiating execution on the pipeline. Specifically, the virtual kick arbitrator includes functionality to select a TVL and initiate execution of the command from the linked list corresponding to the selected TVL in the virtual kick hardware linked list queue.

Continuing with FIG. 4, the host channel adapter includes PCBs (e.g., dedicated PCBs (408), PCB 0 (412a), PCB Z (412b)). A PCB is physical memory that is configured to store a single command. Further, each command requires a single PCB in one or more embodiments of the invention.

Dedicated PCBs correspond to PCBs that are dedicated for use by administrator and management components in one or more embodiments of the invention. For example, dedicated PCBs may be used by the service processor resource manager, the send queue scheduler, a host process for controlling the host channel adapter, and for other such components of the system.

In one or more embodiments of the invention, the host channel adapter includes a PCB pool (410). A PCB pool (410) corresponds to a collection of PCBs (e.g., PCB 0 (412a), PCB Z (412b)) that are available for use by any underlying function. Specifically, each PCB (e.g., PCB 0 (412a), PCB Z (412b)) in the PCB pool (410) may used by any underlying function in one or more embodiments of the invention. When a PCB is in use by an underlying function (e.g., Underlying Function$_0$ (414a), Underlying Function$_Y$ (414b)) to store a command, the PCB is considered bound to the underlying function and cannot be used by another underlying function.

Continuing with FIG. 4, a TVL mapping table is operatively interposed between the PCBs (e.g., dedicated PCBs (408), PCB 0 (412a), PCB Z (412b)) and the virtual kick hardware linked list queue (406) in one or more embodiments of the invention. The TVL mapping table (420) includes a mapping of the underlying function (e.g., Underlying Function$_0$ (414a), Underlying Function$_Y$ (414b)) to one or more TVLs. In particular, the mapping defines, for each underlying function, which TVLs correspond to the underlying function. Specifically, each underlying function may be allocated a set of TVLs. In one or more embodiments of the invention, the mapping of set of TVLs may be storage of an identifier of the underlying function with an identifier of the virtual kick lists corresponding to the TVLs in the set of TVLs.

Additionally, in one or more embodiments of the invention, a set of TVLs may be allocated to the dedicated PCBs (408). Thus, the TVL mapping table (420) may further include a mapping of the dedicated PCBs to the set of TVLs allocated to the dedicated PCBs.

Continuing with FIG. 4, the PCB pool (410) is connected to one or more PCB allocators. A PCB allocator is logic, such as hardware or firmware, configured to select the PCB from the PCB pool (410) for storing a command. Although FIG. 4 shows multiple PCB allocators, a single PCB allocator may exist for all underlying functions. Alternatively or additionally, a separate PCB allocator may exist for each PCB. The PCB allocator is discussed in further detail below and in FIG. 4.

In one or more embodiments of the invention, the PCB allocator further includes functionality to bind the PCB to a VCB (VCB) (e.g., VCB $0_0$ (422a), VCB $N_0$ (422b), VCB $0_Y$ (422c), VCB $T_Y$ (422d)). In one or more embodiments of the invention, a VCB is a virtual address space used by a process on the host to write to a PCB. Specifically, a single VCB is capable of being bound to only a single PCB at any single moment in time in one or more embodiments of the invention. Thus, the binding a PCB to a VCB creates an association between the VCB and the PCB. In other words, the binding prevents the PCB from being used by any other VCB and prevents the VCB from being associated with any other PCB.

In one or more embodiments of the invention, an underlying function CSR (e.g., CSR$_{UF0}$ (424a), CSR$_{UFY}$ (424b)) stores status and control information about the VCBs allocated to the underlying function. Specifically, each underlying function is allocated a set of VCBs from a VCB pool (discussed below and in FIG. 3). The number of VCBs allocated to an underlying function represents a guarantee of the number of commands that the HCA will process for the virtual machine corresponding to the underlying function. In one or more embodiments of the invention, the number of VCBs allocated to an underlying function may exceed the number of PCBs allocated to the underlying function. The flowcharts of FIGS. 6 and 7, discussed below, provide a method for processing requests when the underlying function has a VCB available and no PCBs available.

Continuing with FIG. 4, in one or more embodiments of the invention, the underlying function CSR (e.g., CSR$_{UF0}$ (424a), CSR$_{UFY}$ (424b)) may include a base address register (BAR). The BAR stores the lowest virtual address assigned to the underlying function in one or more embodiments of the invention. The underlying function CSR may further store information about which VCBs are in use in one or more embodiments of the invention.

Figure 5:
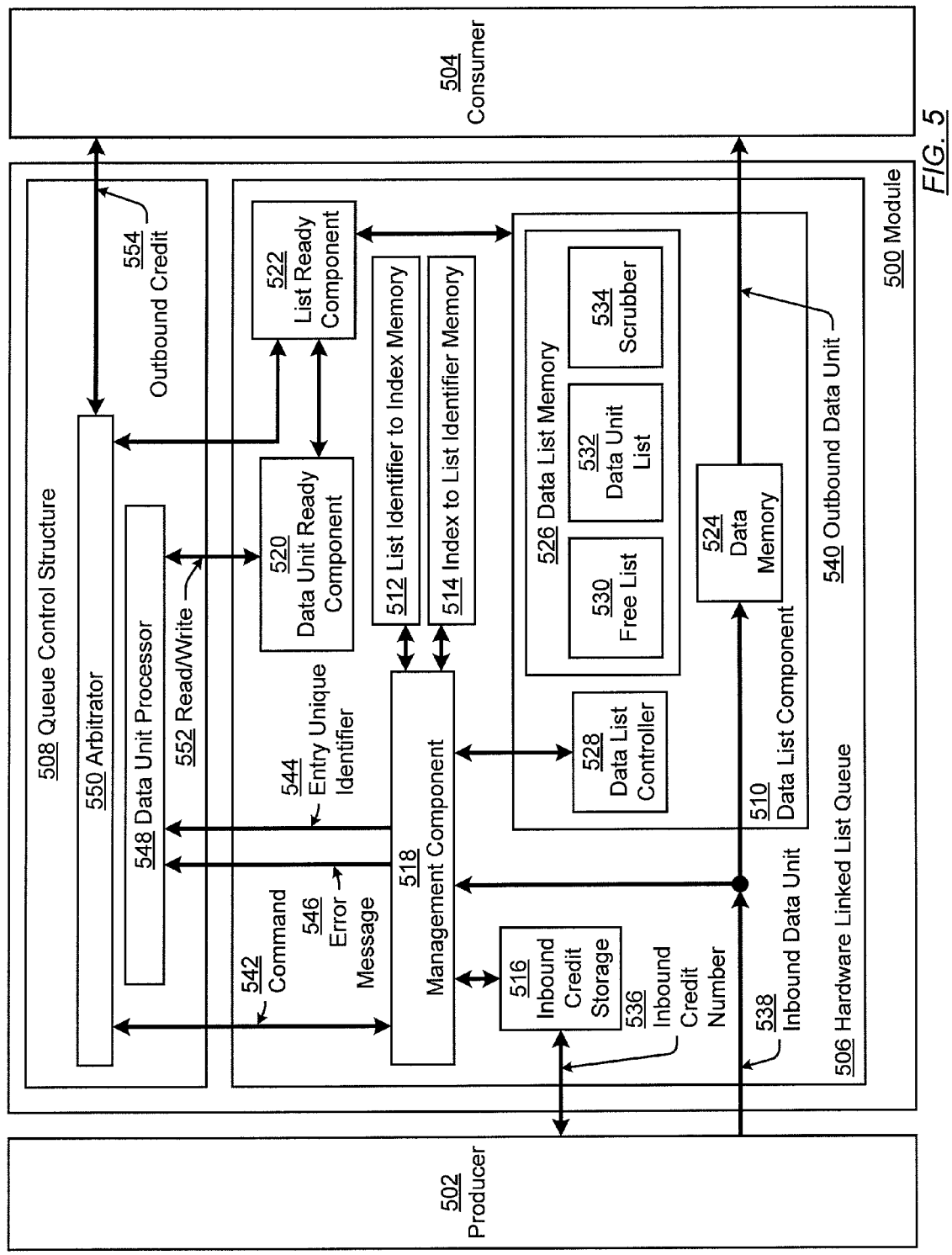

As discussed above with reference to FIG. 2, and as shown by way of an example hardware linked list queue in FIG. 3, various modules of the host channel adapter may each include a hardware linked list queue. FIG. 5 shows a schematic diagram of a module (500) that includes a hardware linked list queue in one or more embodiments of the invention. Specifically, any of the modules that include a hardware linked list queue may correspond to the module (500) shown in FIG. 5. Solid dark lines in FIG. 5 correspond to transmission paths of instructions, data units, commands, and messages in one or more embodiments of the invention. Other communication paths (not shown) may alternatively or additionally exist without departing from the invention.

As shown in FIG. 5, each module (500) is operatively connected to at least one producer (502) and at least one consumer (504). The producer (502) as related to the module (500) is configured to send data unit and/or packets to the module (500). The consumer (504) as related to the module is configured to receive data units and/or packets from the module (500). Further, as shown in FIG. 5, the module (500) includes a hardware linked list queue (506) and a queue control structure (508) in one or more embodiments of the invention. Both of these components are discussed below.

In one or more embodiments of the invention, the hardware linked list queue (506) includes hardware and firmware for storing and individually managing multiple linked lists. For example, the hardware linked list queue (506) may correspond to the queue pair fetch hardware linked list queue, the DMA hardware linked list queue, the Infiniband® packet builder hardware linked list queue, the completion hardware linked list queue, the buffer hardware linked list queue, the receive queue entry hardware linked list queue, the DMA validation hardware linked list queue, or any other hardware linked list queue. In one or more embodiments of the invention, the hardware linked list queue includes a data list component (510), a management component (518), an inbound credit storage (516), a list identifier to index memory (512), an index to list identifier memory (514), a data unit ready component (520), and a list ready component (522). Each of these components is discussed below.

The data list component (510) includes functionality to store and track the storage of data units in the hardware linked list queue (506). In one or more embodiments of the invention, the data list component (510) includes data memory (524), a data list memory (526), and a data list controller (528).

The data memory (524) corresponds to a hardware memory device that includes functionality to store data units. For example, a hardware memory device may correspond to random access memory (RAM). When stored in the hardware linked list queue (506), the data units are located in the data memory (524). In one or more embodiments of the invention, the data memory (524) is partitioned into entries. Each entry includes functionality to store a data unit. Further, in one or more embodiments of the invention, each entry is associated with a corresponding unique identifier for the entry. The unique identifier uniquely identifies the entry with respect to other entries in the data memory (524) in one or more embodiments of the invention. For example, the unique identifier may be a consecutive number, an address of the entry, or any other type of identifier.

In one or more embodiments of the invention, the linked list memory (526) corresponds to a hardware memory device for storing data for tracking linked lists. In one or more embodiments of the invention, the linked list memory (526) includes functionality to store a free list (530), a data unit list (532), and a scrubber (534).

The free list (530) corresponds to a list of entries in the data memory (524) that are available. Specifically, in one or more embodiments of the invention, data memory entries that are identified the free list (530) are available to be allocated to linked lists. In one or more embodiments of the invention, the free list may be maintained as a bit string whereby a single bit exists for each entry in the data memory (524). Specifically, each entry in the data memory (524) has a corresponding unique bit in the bit string. When the corresponding bit is set, then the entry is unavailable. When the corresponding bit is not set, then the entry is available.

The data unit list (532) maintains a listing of which entries of the data memory (524) are in each linked list and the order of entries in each linked list. In one or more embodiments of the invention, the data unit list (532) includes a data unit list entry for each entry in the data memory (524). Specifically, a separate and unique data unit list entry exists for each entry in the data memory (524). In one or more embodiments of the invention, when the entry in the data memory (524) is used by a linked list, the data unit list entry corresponding to the entry in the data memory (524) stores the unique identifier of the next entry allocated to the linked list. For example, consider the scenario in which the linked list includes data unit W located at entry 2, followed by data unit X located at entry 5, followed by data unit Y located at entry 3, followed by data unit Z located at entry 9. In the example, the data unit list entry corresponding to entry 2 stores the unique identify of entry 5, the data unit list entry corresponding to entry 5 stores the unique identify of entry 3, and the data unit list entry corresponding to entry 3 stores the unique identify of entry 9. The data unit list entry corresponding to the last entry in the linked list is associated with or stores a value indicating that the data unit list entry corresponds to the last entry. For example, a separate reference may exist to indicate that the data unit list entry is the last entry. Alternatively or additionally, the data unit list entry may store a value indicating that the entry is the last entry.

In one or more embodiments of the invention, the scrubber (534) includes functionality to detect bit errors in the data memory (524). In one or more embodiments of the invention, the scrubber (534) may include to correct the bit errors in the data memory (524).

Continuing with the data list component (510), the linked list memory (526) is operatively connected to the data list controller (528). In one or more embodiments of the invention, the data list controller (528) corresponds to hardware and/or firmware logic that includes functionality to maintain the data list memory (526) and provide information to the management component (518) (discussed below). Specifically, the data list controller (528) includes functionality to update the data list memory (526) when changes are made to the data memory (524). Further, the data list controller (528) includes functionality to return an identifier of an available entry in the data memory (524) and the next entry of a linked list stored in the data memory (524). In one or more embodiments of the invention, the data list controller (528) includes functionality to store, for each linked list in the data memory (524), a head pointer referencing the first entry in the linked list. Additionally or alternatively, in one or more embodiments of the invention, the data list controller (528) includes functionality to store, for each linked list in the data memory (524), a tail pointer referencing the last entry in the linked list.

In one or more embodiments of the invention, the data list controller (528) further includes functionality to store a data unit counter (not shown) for each linked list. In one or more embodiments of the invention, the data unit counter is the total entries allocated to the linked list and/or available to be allocated to the linked list. For example, consider the scenario in which a linked list has a maximum allocated allowance of ten entries and has three entries used. In the example, the data unit counter may store the value of ten as the maximum allocated allowance, the value of three as the number of entries in the linked list, and/or the value of seven as the number of remaining entries that may be used by the linked list. Alternatively, the data unit counter may not store any value associated with the maximum allocated allowance.

In one or more embodiments of the invention, the inbound credit storage (516) stores the inbound credit number (536). The inbound credit number (536) is the number entries available in the free list. In other words, the inbound credit number (536) is the number of data units that may be added to the data memory (524). In one or more embodiments of the invention, when a data unit is added to the data memory (524) (e.g., an inbound data unit and index number (538) is received from the producer (502)), the inbound credit number is decremented in the inbound credit storage (516). When a data unit is removed from the data memory (524) (e.g., an outbound data unit and index number (540) is transmitted to the consumer (504)), the inbound credit number is incremented in the inbound credit storage (516). In one or more embodiments of the invention, the producer (502) includes functionality to read the inbound credit number (536) from the inbound credit storage (516). To the producer (502), the inbound credit number (536) may be referred to as an outbound credit number (discussed below).

Continuing with the hardware linked list queue (506) in FIG. 5, the list identifier to index memory (512) corresponds to a hardware storage device for associating a list identifier of a linked list in data memory (524) with an index value. Specifically, in one or more embodiments of the invention, the index value is a value provided in the data unit that associates the data unit with a linked list. For example, the index value may be a queue pair identifier, a TVL identifier, or another identifier. The list identifier of the linked list is an identifier used by the module (500) to reference the linked list. For example, the list identifier of the linked list may be a unique identifier of the location of the head pointer for the linked list, a number in a series of consecutive numbers where each number is an identifier of a linked list, or another identifier used by the module. In one or more embodiments of the invention, the list to index memory may correspond to RAM, content addressable memory (CAM) structure, or another type of memory.

In one or more embodiments of the invention, the index to list identifier memory (514) corresponds to a hardware storage device for associating each linked list in the data memory (524) with the corresponding linked list. In one or more embodiments of the invention, the index to list memory (514) may correspond to RAM, a CAM structure, or another type of memory.

In one or more embodiments of the invention, the list to index memory (512), the index to list memory (514), inbound credit storage (536), and data list component (510) are operatively connected to a management component (518). The management component (518) includes functionality to store data units in the data memory (524), manage the contents of the list to index memory (512) and index to list memory (514), and update the inbound credit storage (516). In one or more embodiments of the invention, the management component further includes functionality to determine whether a linked list corresponding to an inbound data unit (538) is allocated in the data memory (524) and allocate a new linked list when the linked list is not allocated. Further, the management component (518) includes functionality to identify the linked list corresponding to the inbound data unit (538) and add the inbound data unit (538) to the linked list in the data memory (524). In one or more embodiments of the invention, the management component (518) further includes functionality to update the queue control structure (508) (discussed below) with the unique identifier of the entry (544) used to store the inbound data unit (538) and with an error message (546) for any errors on the hardware linked list queue (506). In one or more embodiments of the invention, the management component (518) includes functionality to transmit a command identifier (542) of the command in the data unit to the arbitrator (550) (discussed below).

Continuing with the hardware linked list queue (506), in one or more embodiments of the invention, the data unit ready component (520) corresponds to memory and logic configured to identify when data units in entries of the data memory are ready for forwarding to the consumer (504). A data unit is ready for forwarding to the consumer (504) when additional processing by the module (500) on the data unit is not required. Conversely, a data unit is not ready for forwarding to the consumer (504) when initial or additional processing of the data unit by the data unit processor (548) is required. For example, the data unit may be ready immediately upon receipt by the module (500) when no processing is required on the data unit. As another example, the data unit may be ready after the data unit processor (548) (discuss below) completes processing of the data unit. In one or more embodiments of the invention, the data unit ready component stores a bit string. Each entry in the bit string corresponds to a separate and unique entry in the data memory (524). The entry in the bit string is set when the data unit in the corresponding entry in the data memory (524) is ready. The entry in the bit string is not set when the data unit in the corresponding entry in the data memory is not ready or when the corresponding entry in the data memory does not contain a data unit.

In one or more embodiments of the invention, the list ready component (522) corresponds to memory and logic configured to identify when the first entry of each linked list is ready for transmission to the consumer (504). Specifically, in one or more embodiments of the invention, the list ready component (522) includes functionality to determine, for each linked list, whether the entry referenced by the head pointer of the linked list has the corresponding ready bit set. In one or more embodiments of the invention, the list ready component (522) maintains a data structure that associates each linked list with a list ready bit. If the first entry of the linked list has the ready bit set, then the list ready bit is set in the data structure maintained by the list ready component (522). By having the list ready component that includes a bit for each linked list, linked lists may be individual managed. Specifically, when the first data unit in a linked list is ready for transmission to the consumer, the first data unit may be sent to the consumer even when the oldest data unit in the linked list queue that is in a different linked list is not ready for transmission. Thus, as shown in the example, the individual management allows for data units to be transmitted without having to wait for processing to complete on data units in other linked lists.

Continuing with the module (500), the queue control structure (508) corresponds to logic and memory for controlling the hardware linked list queue (506). In one or more embodiments of the invention, the queue control structure (508) includes a data unit processor (548) and an arbitrator (550). The data unit processor (548) corresponds to logic for performing the functionality of the module (500). For example, the data unit processor may correspond to the queue pair fetch data unit processor, the DMA data unit processor, the Infiniband® packet builder data unit processor, the completion data unit processor, the buffer data unit processor, the receive queue entry data unit processor, the DMA validation data unit processor, or any other data unit processor.

In one or more embodiments of the invention, the data unit processor (548) is configured to process each data unit in the hardware linked list queue requiring processing. For example, if the module (500) is a DMA module, the data unit processor includes functionality to process all data units in the hardware linked list queue that require DMA. In one or more embodiments of the invention, the data unit processor (548) further includes functionality to update the data unit ready component (520) when a data unit is ready (e.g., processing of the data unit by the module (500) is complete or no processing by the module (500) needs to be performed on the data unit). Specifically, the data unit processor (548) includes functionality to read and/or write (552) to the data unit ready component (520).

In one or more embodiments of the invention, the arbitrator (550) includes functionality to identify from the list ready component (522) when the first data unit of a linked list is ready and initiate transmission of the first data unit (504) to the consumer. In one or more embodiments of the invention, the arbitrator (550) further includes functionality to select, from amongst all linked list having the corresponding list ready bit set, a linked list from which to forward a data unit. In one or more embodiments of the invention, the arbitrator (550) further includes functionality to read the outbound credit number (554), and forward a data unit only when an outbound credit is available. In one or more embodiments of the invention, the outbound credit number (554) represents the number of data units that may be forwarded to the consumer (504). In particular, to the consumer (504), the outbound credit is referred to as an inbound credit (discussed above).

Although FIG. 5 shows a certain configuration of components, other configurations may be used without departing from the invention. By way of an example, all or a portion of the functionality of multiple components may be performed by a single component. As another example, all or a portion of the functionality performed by a single component may be performed by one or more other components shown or not shown in FIG. 5. Further, different memory structures may be used, and additional component with additional functionality may exist without departing from the invention. Additionally or alternatively, other connections between components may exist.

Although FIGS. 1-5 show a certain configuration of components, other configurations may be used without departing from the invention. For example, rather than having a PCB pool from which any underlying function may use, individual PCB may be allocated to a particular underlying function to be used solely for the particular underlying function. Other variations of the system may be used without departing from the invention.

Figure 6:
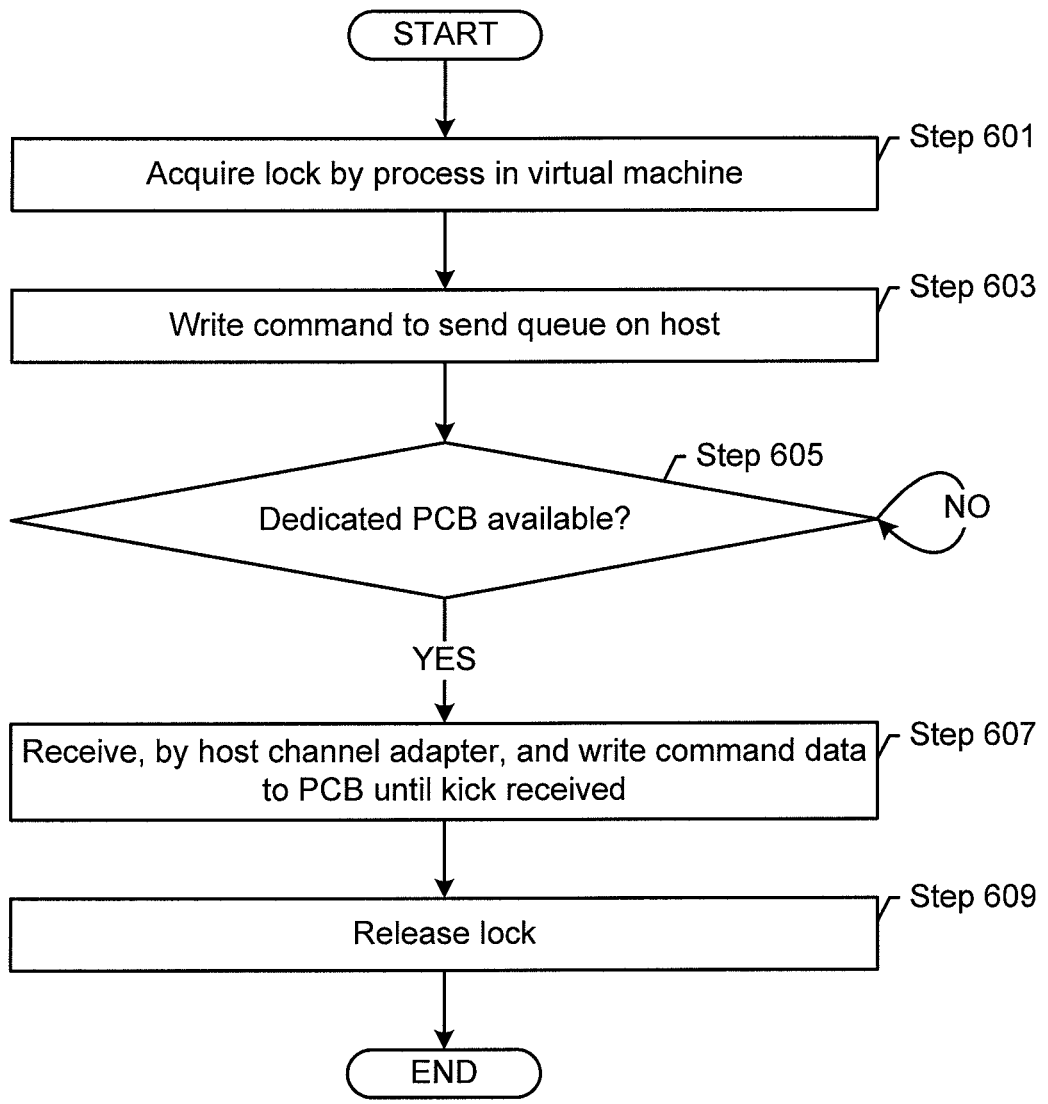
FIGS. 6-12 show flowcharts in one or more embodiments of the invention.

FIGS. 6-10 show flowcharts for processing commands in one or more embodiments of the invention. As discussed above, the hardware linked list queue may be included in any type of communications adapter. FIGS. 6-10 show flowcharts when the communications adapter is a host channel adapter in one or more embodiments of the invention. FIG. 6 shows a flowchart for using the dedicated PCBs by a process in a virtual machine in one or more embodiments of the invention.

In Step 601, a process executing in a virtual machine acquires a lock to the dedicated PCB. In one or more embodiments of the invention, the lock is located on the host channel adapter. In Step 603, the process executing in the virtual machine writes a command to the send queue on the host. In one or more embodiments of the invention, the writing of the command to the send queue may be performed by acquiring a separate lock corresponding to the memory location of physical memory having the send queue and storing the command in the memory location.

Continuing with FIG. 6, in Step 605, the virtual machine determines whether a dedicated PCB is available. In one or more embodiments of the invention, determining whether a dedicated PCB is available may be performed by checking a CSR that indicates whether the corresponding dedicated PCB is in use. In one or more embodiments of the invention, the CSR may be set and checked by both hosts processes and the embedded processor subsystem.

In Step 607, when the dedicated PCB is available, the host channel adapter receives command data (i.e., data in the command) and writes the command data to the PCB until the kick is received. Specifically, in one or more embodiments of the invention, the command data may be transmitted to the host channel adapter using the PCI express fabric. Each command may be of variable length. The kick indicates that the entirety of the command is stored in the PCB. Performing Step 607 is discussed below and in FIG. 9. Continuing with FIG. 6, in Step 609, the lock is released in one or more embodiments of the invention.

Although FIG. 6 shows a flowchart for a process on the host to use the dedicated PCB, in one or more embodiments of the invention, dedicated PCBs may be used by the virtual machine manager, the send queue scheduler, portions of the electronic processor subsystem, and other components to perform management functions.

Figure 7:
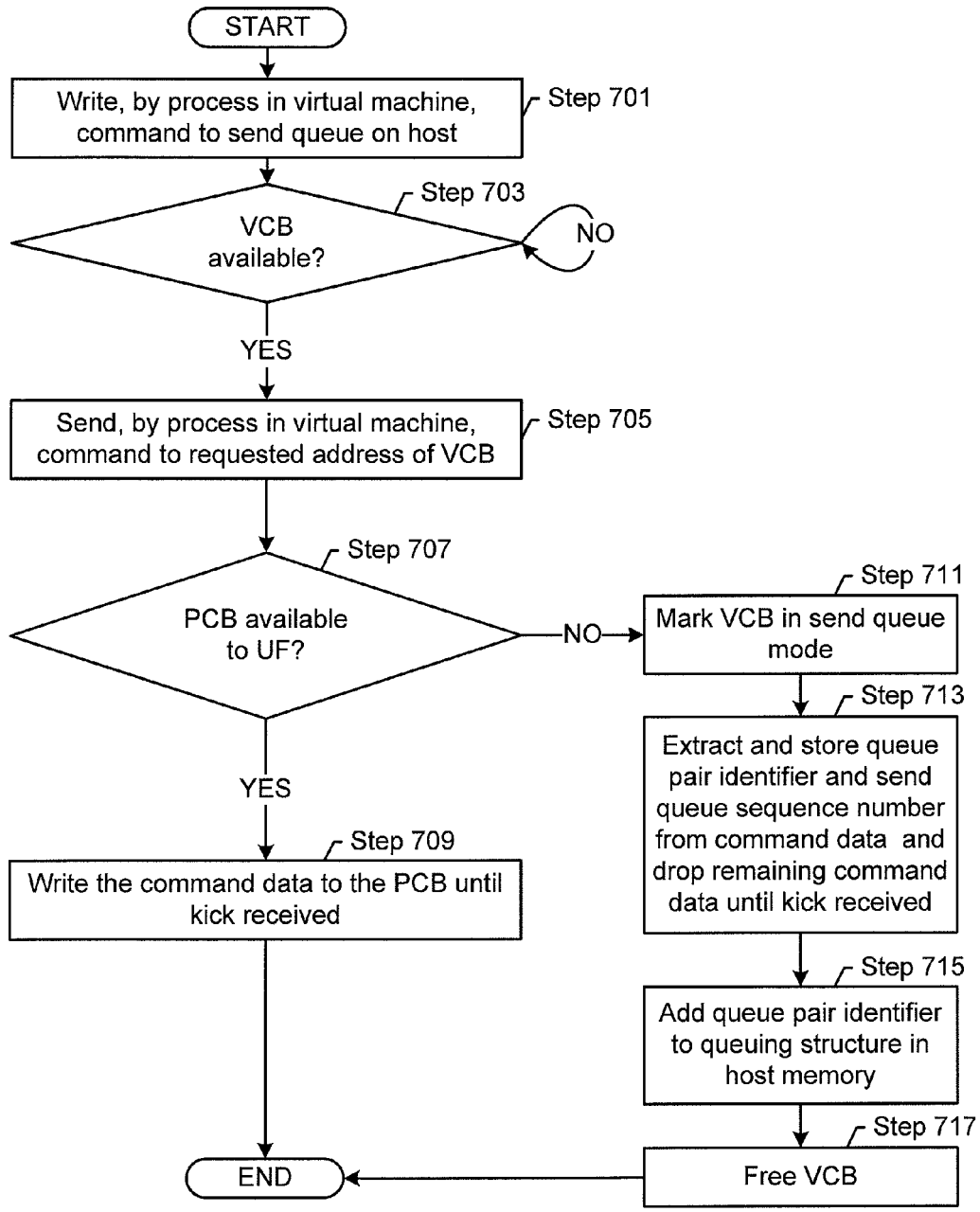

FIG. 7 shows a flowchart for a virtual machine (e.g., control virtual machine, guest virtual machine) to send a command to the host channel adapter using VCBs. In Step 701, a process in the virtual machine writes the command to the send queue on the host. As discussed above, to write the command to the send queue, the process may acquire a lock for the send queue.

In Step 703, a determination is made about whether a VCB is available. Management of the usage of the VCBs is performed by the virtual machine operating system in one or more embodiments of the invention. Specifically, the virtual machine operating system allocates the VCBs to the process in the virtual machine requesting the VCB. The process selects the VCB to allocate from the set of VCBs allocated to the process. If a VCB is not available, then the process waits.

When a VCB is available, the process in the virtual machine sends a command to the requested address of the VCB in Step 705. At this stage, once the command is sent to the VCB, to the process, the command is processed by the host channel adapter. However, the physical resources may not be available on the host channel adapter.

In Step 707 a determination is made about whether a PCB is available to the underlying function. Specifically, when command data corresponding to a new command is received, the PCB allocator determines, based on the VCB address, whether a PCB is available. For example, the PCB allocator may first check whether a PCB corresponding to the underlying function is available. If a PCB corresponding to the underlying function is not available, then the PCB allocator may check whether a PCB shared amongst the underlying functions is available. Checking whether a PCB is available may be performed by checking a CSR to determine whether the maximum allocated number of PCBs is in use.

In Step 709, if a PCB is available, then PCB is bound to the VCB and the command data is written to the PCB. In one or more embodiments of the invention, the binding means that any subsequent command data written to the VCB for the command is stored in the PCB bound to the VCB. Writing command data until the kick is received may be performed as discussed above with reference to Step 607 in FIG. 6.

Continuing with FIG. 7, if a PCB is not available, then the VCB is marked to be in send queue mode in Step 711. By marking the VCB in send queue mode, the command is set to be later obtained from the send queue.

In Step 713, the queue pair identifier and the send queue sequence number is extracted from the command data and the remaining command data is dropped until the kick is received. In one or more embodiments of the invention, the queue pair identifier corresponds to the queue pair to which the command is directed. The send queue sequence number provides an identifier of where the command was stored in the send queue in Step 701 (discussed above).

As discussed above, the non-existence of a PCB may be hidden from the process in the virtual machine Accordingly, the process of the virtual machine may send command data for the entire command to the host channel adapter. However, as discussed above, the remaining command data is dropped in one or more embodiments of the invention.

Figure 8:
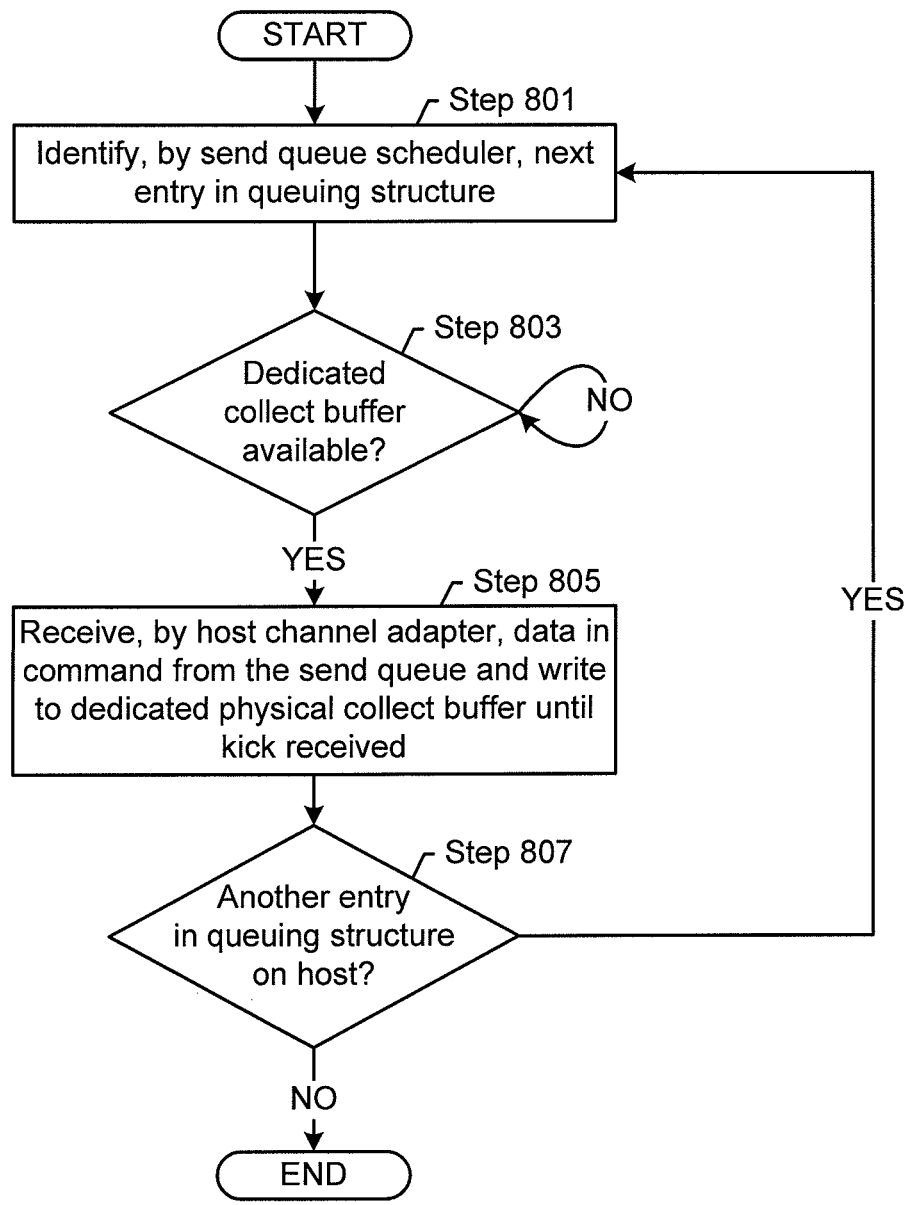

In Step 715, the queue pair identifier and the send queue sequence number is added to the queuing structure in host memory. By adding the queue pair identifier and the send queue sequence number to the queuing structure, the command may be obtained by the send queue scheduler and stored on the host channel adapter. In Step 717, once the kick is received, the VCB is freed. At this stage, the VCB may be used by other processes in the virtual machine FIG. 8 shows a flowchart for the send queue scheduler to store commands on the host channel adapter in one or more embodiments of the invention. In one or more embodiments of the invention, the send queue scheduler stores commands on the host channel adapter for a process in a virtual machine when a PCB is unavailable to the process in the virtual machine as discussed above and in FIG. 6. Thus, the operations of and the resources used by the send queue scheduler is shared between processes in different virtual machines In Step 801, the send queue scheduler identifies the next entry in the queuing structure. In one or more embodiments of the invention, the queuing structure is a first in first out queue. In such embodiments, the next entry in the queuing structure is the oldest entry in the queuing structure.

In Step 803, the send queue scheduler determines whether a dedicated PCB is available. Determining whether a dedicated PCB is available may be performed as discussed above with reference to Step 605 of FIG. 6.

When a dedicated PCB is available, the send queue scheduler obtains the send queue sequence number and the queue pair identifier in the queuing structure. The scheduler requests the command from the send queue location corresponding to the send queue sequence number using the queue pair identifier. When the scheduler requests the command, the command data is transferred to the host channel adapter.

In Step 805, the host channel adapter receives the command data from the send queue and writes the data to the dedicated PCB until the kick is received. Step 805 may be performed in a similar manner as discussed above with reference to Step 607 in FIG. 6.

In Step 807, a determination is made about whether another entry in the queuing structure on the host exists. If another entry exists, then the send queue scheduler continues FIG. 8 to process the next entry in the queuing structure.

Figure 9:
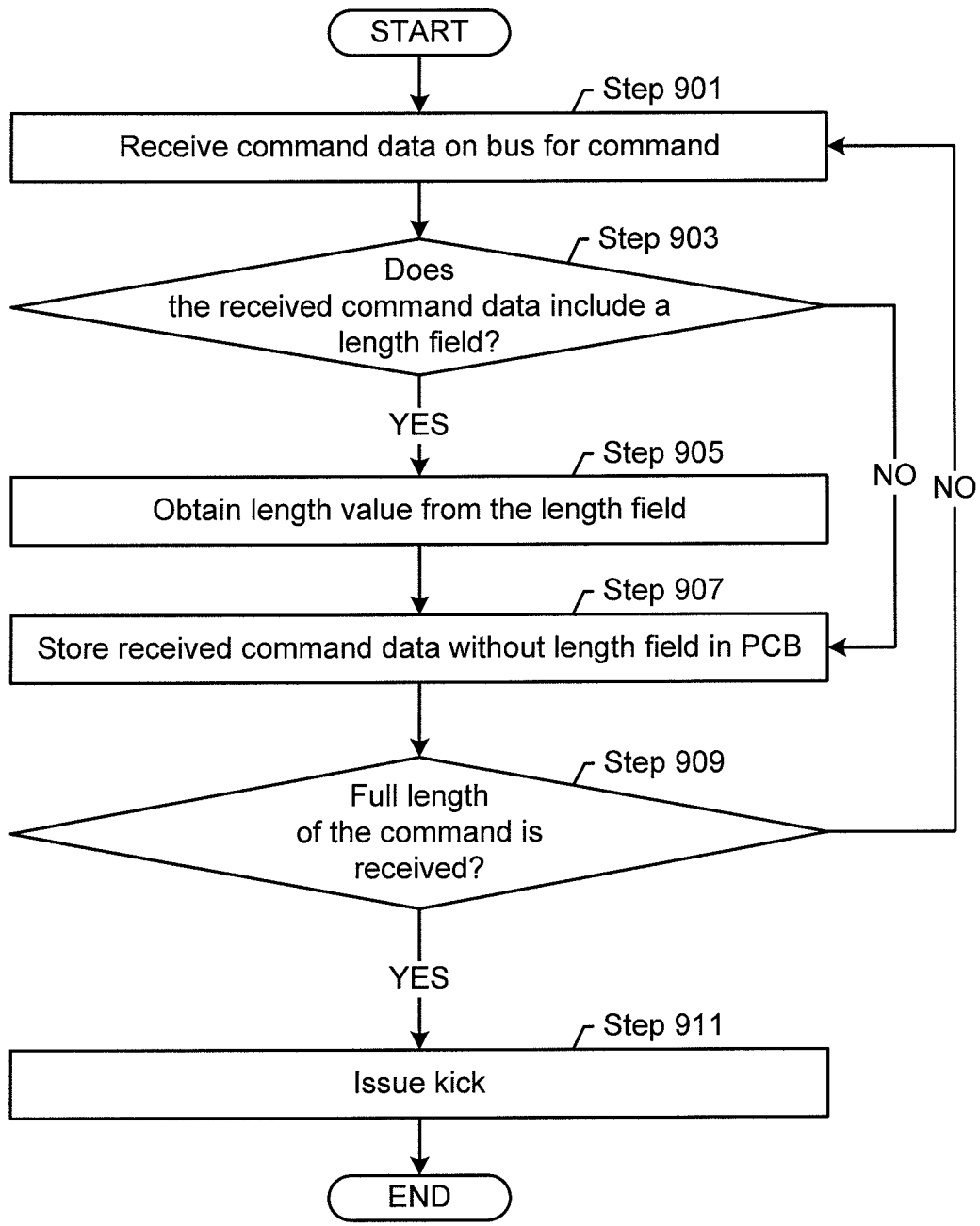

FIG. 9 shows a flowchart for receiving command data until a kick is received in one or more embodiments of the invention. In one or more embodiments of the invention, a kick may be an explicit kick or a virtual kick. An explicit kick is an instruction sent at the end of the command, when all command data is received, that indicates additional command data does not exist. When an explicit kick instruction is received, the host channel adapter may process the explicit kick. Specifically, the host channel adapter may add an identifier of the PCB to the virtual kick linked list corresponding to the TVL. In contrast to the explicit kicks, in one or more embodiments of the invention, virtual kicks are kicks that are based on a length transmitted in the command data. FIG. 9 shows a flowchart for the host channel adapter to receive commands that use virtual kicks.

In Step 901, command data is received on the PCI express fabric bus. In one or more embodiments of the invention, the command data received is in conformance with a predefined protocol. For example, the predefined protocol may set the position of the address, the type of command, and the length field as well as remaining data in the command. The length field may be defined according to the predefined protocol as being located at a particular portion of the command, such as starting at a particular bit location, or otherwise being specified by the predefined protocol.

In Step 903, a determination is made about whether the received command data includes a length field. Determining whether the received command data includes the length field may be performed using the predefined protocol. In Step 905, if the received command data includes a length field, the length value is obtained from the length field. At this stage, the host channel adapter has information regarding the size of the command.

In Step 907, regardless of whether the received command data includes a length field, the received command data without the length field is stored in the PCB. For example, the received command data is stored in the PCB bound to the VCB to which the command data is addressed.

In Step 909, a determination is made about whether the full length of the command is received. If the received command data, including previously received command data, does not include a length field, then the full length of the command may be determined not to be received. Specifically, because the command includes a length field when virtual kicks are used, the absence of the length field indicates that at least the portion of the command having the length field is not yet received. If all received command data includes a length field, determining whether the full length of the command data is received may be performed by comparing the length value with the amount of the command received.

In one or more embodiments of the invention, the following method may be used to determine whether the full length of the command is received. The length value may be used to create a scoreboard mask. The scoreboard mask is a bit mask has bits that exceed the length preset. A scoreboard is used to track portions of the command data received. The scoreboard may be a series of bits. Each bit represents a position of command data in the command. Specifically, when command data is received, the position of the command data within the command is used to update the scoreboard. When an "or" operation on the scoreboard and the scoreboard mask results in all bits being set, then the determination is made that the full length of the command is received. Other methods may be used to determine whether the full length of the command is received without departing from the invention.

If the full length of the command is not received, then the method may repeat with Step 901 to receive command data for the command on the bus. If the full length of the command is received, then a kick is issued in Step 911 in one or more embodiments of the invention. Issuing a kick may be performed by accessing the TVL mapping table to identify the TVL corresponding to the command. Specifically, from the TVL mapping table the TVL or set of TVLs corresponding to the QoS level and the underlying function is identified. If a set of TVLs are identified, then a TVL may be selected from the set of TVLs, such as by using a load balancing protocol.

The virtual kick linked list corresponding to the selected TVL is identified and an identifier of the PCB having the command is stored in the virtual kick linked list. When the identifier of the PCB is in the virtual kick linked list, the command is deemed ready for processing by the non-blocking pipeline in one or more embodiments of the invention.

Figure 10:
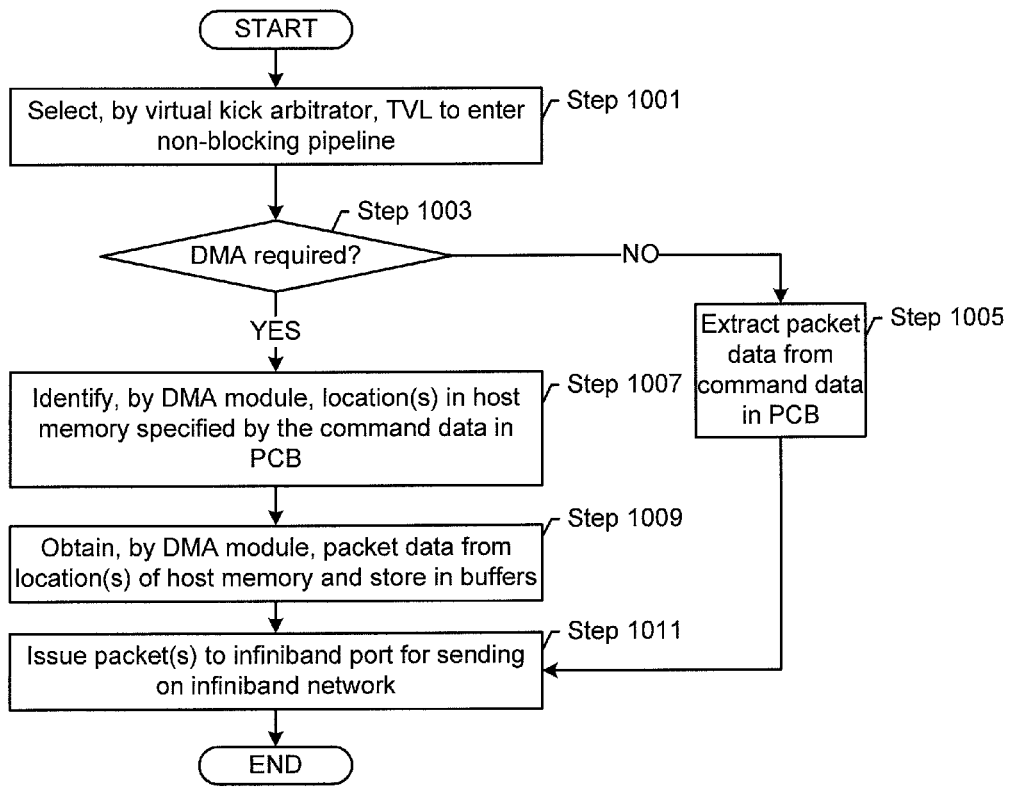

FIG. 10 shows a flowchart for processing the command through a non-blocking pipeline in one or more embodiments of the invention. In Step 1001, the virtual kick arbitrator selects a TVL to enter the non-blocking pipeline. The virtual kick arbitrator may select the TVL in accordance with a load balancing protocol. For example, the load balancing protocol may be round robin, weighted round robin, etc.

In Step 1003, a determination is made about whether DMA is required. In one or more embodiments of the invention, the host channel adapter supports DMA between the host memory and the host channel adapter. For example, command data sent to the host channel adapter may include the packet data for packets to send on the Infiniband® network. In such a scenario, in Step 1005, if DMA is not required, then the packet data is extracted from the command in the PCB.

Alternatively, the command data may specify a location in host memory, such as the location of packet data. If the command data specifies a location in host memory, then DMA is required to obtain the command data. In Step 1007, a DMA module identifies one or more locations in host memory that are specified in the command data in the PCB. In Step 1009, the DMA module obtains the packet data from the one or more locations in host memory and stores the packet data into buffers. In one or more embodiments of the invention, as part of obtaining the packet data, the DMA may perform validation to ensure that the host process sending the command has necessary permissions to obtain the packet data.

In Step 1011, regardless of whether DMA is performed to obtain the packet data, the packets are issue to the Infiniband® port for sending on the Infiniband® network. In particular packets are generated from the packet data. The generating of the packets may include performing various levels of identification and validation, such as validating the send queue sending the packet(s) and the receive queue receiving the packet(s).

Figure 11:
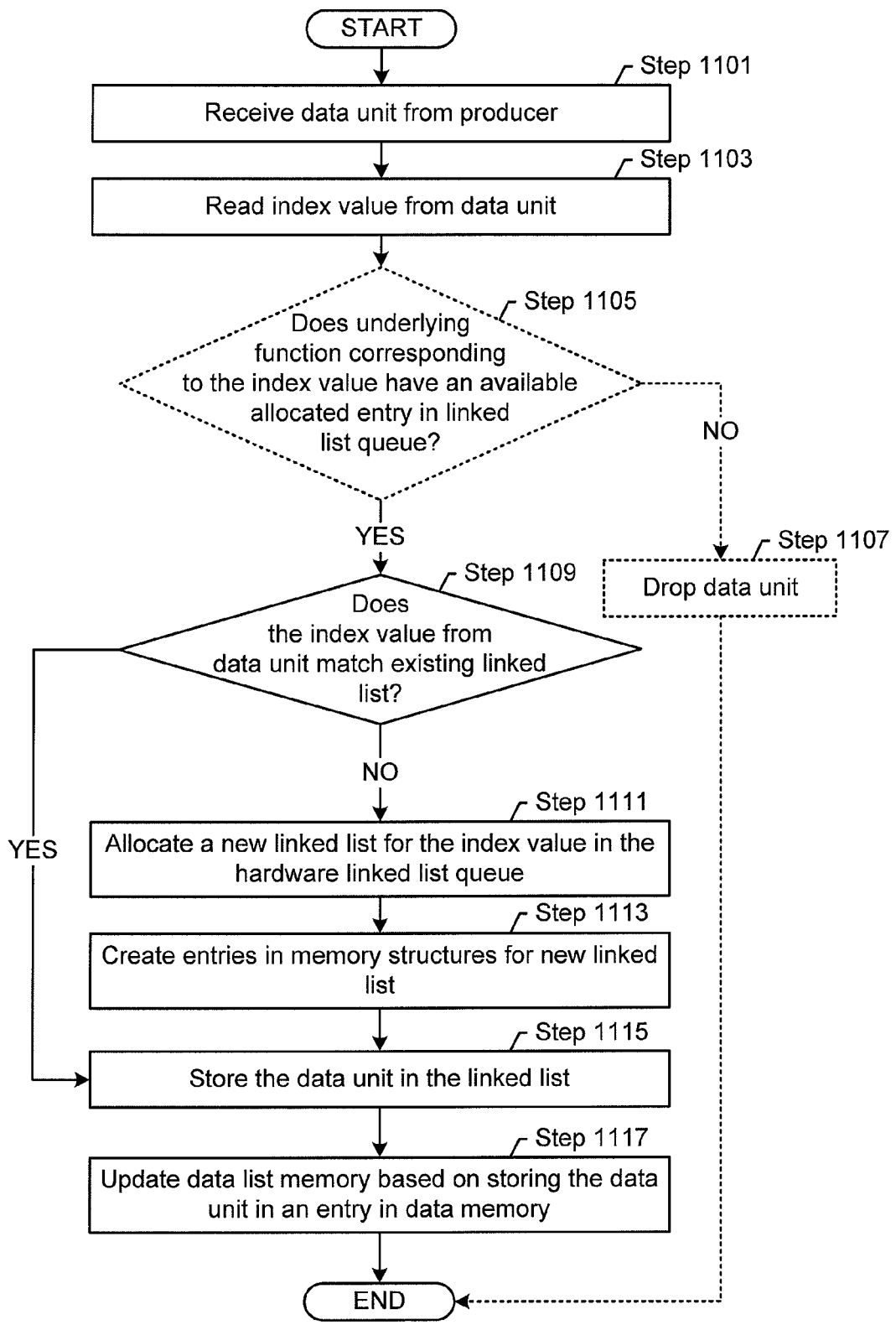

FIG. 11 shows a flowchart for adding a new data unit to the hardware linked list queue in one or more embodiments of the invention. In Step 1101, a data unit is received from a producer. In one or more embodiments of the invention, after the producer does the producer's processing on the data unit, the producer transmits the data unit to the module. In one or more embodiments of the invention, the producer transmits the data units in order of sequence number of the queue pair on a per queue pair basis. Thus, when the data units are received from the producer, the data units are in the correct order in one or more embodiments of the invention.

In Step 1103, the index value is read from the data unit in one or more embodiments of the invention. In one or more embodiments of the invention, which index value is read may be dependent on the type of the module. For example, if the module is the virtual kick module, then the index value that is read may be the TVL assigned to the data unit. If the module is the DMA module, then the index value that is read may be the queue pair identifier assigned to the data unit in one or more embodiments of the invention. Other index values may be used without departing from the invention. In one or more embodiments of the invention, the management component reads the index value.

In Step 1105, a determination may be made about whether the underlying function corresponding to the index value have an available allocated entry in the hardware linked list queue. Specifically, if underlying functions are allocated only a certain number of entries in the data memory, then the hardware linked list queue may include functionality to prevent the underlying function from using more than the allocated number of entries. For example, the management component may determine whether the underlying function has at least one entry credit available. The number of entry credits may be stored in a counter on the module in one or more embodiments of the invention.

If an entry credit is available, then the underlying function is determined to have an available allocated entry and the method proceeds to Step 1109. If an entry credit is not available, then the underlying function is determined not to have an available allocated entry and the data unit is dropped in Step 1107. In one or more embodiments of the invention, Steps 1105 and 1107 are shown as optional as whether the steps are performed may be dependent on the type of module. For example, the virtual kick module may support preventing underlying functions from using more than the allocated number of entries, while the Infiniband® packet builder module may not support preventing the underlying function from using more than the allocated number of entries.

Continuing with FIG. 11, in Step 1109, a determination is made about whether the index value of the data unit match an existing linked list. In one or more embodiments of the invention, to determine whether the index value matches an existing linked list, the management component may check the index to list identifier memory. If the index value is found in the index to list identifier memory and has a corresponding list identifier, then the list identifier is obtained and the index value of the data unit is deemed to match an existing linked list in one or more embodiments of the invention. If the index value is not found in the index to list identifier memory, then the data unit does not match an existing linked list in one or more embodiments of the invention.

In Step 1111, a new linked list is allocated for the index value in the hardware linked list queue. Specifically, a new list identifier is obtained. In one or more embodiments of the invention, a component of the hardware linked list queue (e.g., data list controller, management component, list identifier to index memory, or another component) maintains a set of list identifiers. The list identifiers in the set may or may not be assigned to an index value. Specifically, the list identifiers that are not assigned to any index value may be deemed available. In one or more embodiments of the invention, the component maintaining the set of list identifiers may provide an available list identifier to the management component. For example, the available list identifier provided may be the first available list identifier in the set of list identifiers. However, other list identifiers may be provided without departing from the invention.

In one or more embodiments of the invention, with the allocation of the new linked list entries, one or more memory structures on the hardware linked list queue are created in Step 1113. For example, the data list controller may update the list identifier to index memory and the index to list identifier memory to associate the list identifier of the new linked list with the index value of the data unit.

In Step 1115, the data unit is stored in the linked list in one or more embodiments of the invention. Specifically, an available entry in the data memory may be selected from the free list and returned to the management component. The management component may trigger the storage of the data unit in the available entry.

In Step 1117, the data list memory is updated based on storing the data unit in an entry in the data memory. In one or more embodiments of the invention, updating the data list memory may be performed as follows: (i) an identifier of the entry storing the data unit is removed from the free list, thereby making the entry storing the data unit is no longer available; (ii) if the linked list is a new linked list, a tail pointer and a head pointer corresponding to the list identifier is set to reference the entry in data unit list memory corresponding to the entry in the data memory storing the data unit; and (iii) if the linked list is not a new linked list, then the following steps may be performed: (a) the tail pointer referencing previous last entry in the data unit list is identified; (b) the previous last entry in the data unit list is updated to reference the new last entry in the data unit list, where the entry in the data memory storing the data unit corresponds to the new last entry in the data unit list; and (c) the tail pointer corresponding to the linked list is updated to reference the new last entry in the data unit list. In one or more embodiments of the invention, the data list controller may perform the updates using an identifier of the entry in the data memory and the list identifier.

Figure 12:
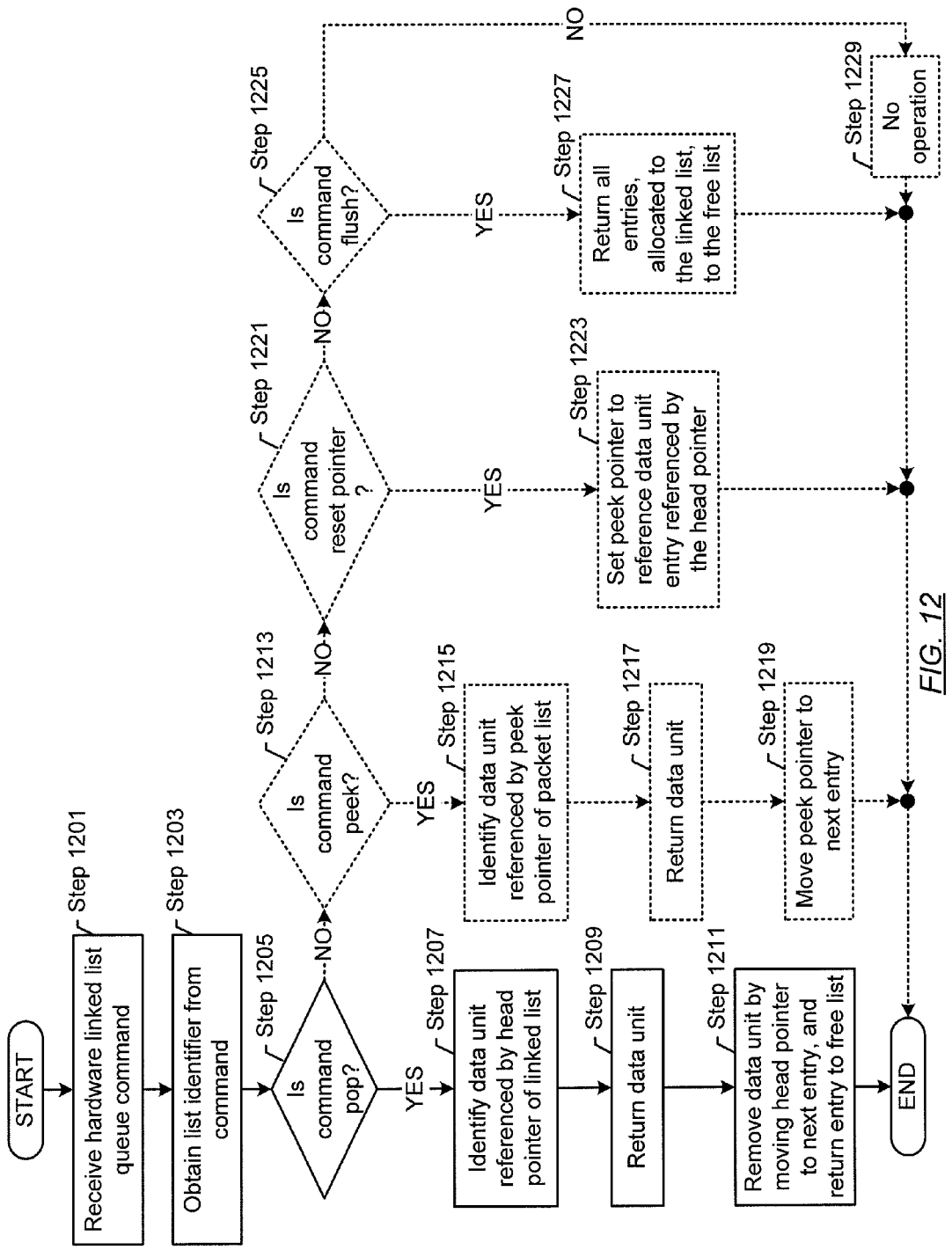

FIG. 12 shows a flowchart for handling requests for data units stored in the hardware linked list queue in one or more embodiments of the invention. In Step 1201, a hardware linked list queue command is received. For example, the data unit processor or the arbitrator may send a command to the management component requesting a data unit. In one or more embodiments of the invention, the hardware linked list queue command may be a pop command, a peek command, a reset pointer command, and/or a flush command. Other hardware linked list queue commands may exist without departing from the invention. In one or more embodiments of the invention, a pop command and/or a peek command may be referred to as a transmission request. Specifically, a transmission request is a request to send a data unit to a data unit processor or a consumer in one or more embodiments of the invention. In one or more embodiments of the invention, the command includes a list identifier. In Step 1203, the list identifier is obtained from the command.

In Step 1205, a determination is made about whether the command is a pop command in one or more embodiments of the invention. A pop command is a command to remove an entry in the linked list referenced by the list identifier. In one or more embodiments of the invention, data units are removed from the linked list using pop commands in order of the linked list. By requiring that data units are removed in order, the hardware linked list queue preserves the ordering of messages transmitted on the Infiniband® network for a particular linked list. In one or more embodiments of the invention, the pop command may be issued when the list ready bit for the linked list is set. For example, the pop command may be issued by an arbitrator for the linked list after arbitrator determines that the linked list is the next list to send a data unit and confirming that an outbound credit is available to the module.

In Step 1207, the data unit referenced by the head pointer of the linked list is identified. Specifically, in one or more embodiments of the invention, the head pointer references an entry in the data unit list. The data unit is obtained from the entry in the data memory corresponding to the entry in the data unit list. In Step 1209, the obtained data unit is returned. In one or more embodiments of the invention, the data unit is forwarded to the consumer module.

In Step 1211, the data unit is removed by moving the head pointer to reference to the next entry, corresponding to the linked list, in the data unit list and returning the entry to the free list. Moving the head pointer may include identifying the current entry in the data unit list referenced by the head pointer. The value stored in the current entry is obtained. The value identifies the next entry in the data unit list in one or more embodiments of the invention. The value may be stored in the head pointer. Further, the entry that stored the popped data unit is returned to the free list. Additionally, if the entry is the last entry in the linked list, in one or more embodiments of the invention, references to the index corresponding to the linked list are removed from the list identifier to index memory and the index to list identifier memory.

In Step 1205, if the command is not a pop command, the command may be a peek command. A peek command is a command to view the data unit without removing the data unit. In one or more embodiments of the invention, similar to a pop command, multiple peek commands allows for the viewing of multiple data units in FIFO order. However, the data unit is not removed from data memory and may be accessed again. In Step 1213, a determination is made about whether the command is a peek command in one or more embodiments of the invention. A peek command may be used, for example, by the data processor to process an entry in the hardware linked list queue. In Step 1215, if the command is a peek command, the data unit referenced by a peek pointer of the linked list is identified. In one or more embodiments of the invention, the peek pointer is a pointer that references the next entry in the linked list that has not been returned. Performing Step 1215 may be performed in a similar manner to using the head pointer as discussed above with reference to Step 1207. In Step 1217, the obtained data unit is returned. For example, the data unit may be transmitted to the data unit processor for processing.

In one or more embodiments of the invention, a peek pointer is moved to the next entry in Step 1219. The peek pointer may be a separate pointer in the data list controller. Moving the peek pointer may be performed in a similar manner to moving the head pointer as discussed above with reference to Step 1211. In one or more embodiments of the invention, by moving the head pointer when a peek command is received, the hardware linked list queue may support processing multiple data units in a linked list without removing the data units from the hardware linked list queue. Thus, whether subsequent data units in a linked list are processed may not be dependent on whether the first data unit in the linked list is removed.

In one or more embodiments of the invention, if the command is not a peek, the command may be a reset pointer command. In Step 1221, a determination is made about whether the command is a reset pointer command. If the command is a reset pointer command, then the peek pointer is set to reference the data unit list entry referenced by the head pointer in Step 1223.

In one or more embodiments of the invention, if the command is not a reset pointer command, then a determination is made whether the command is a flush command reclaim the memory to store the linked list in Step 1225. In Step 1227, if the command is a reclaim command, then all entries allocated to the linked list are returned to the free list. Further, in one or more embodiments of the invention, references to the index corresponding to the linked list are removed from the list identifier to index memory and the index to list identifier memory.

In one or more embodiments of the invention, if the command does not match any recognized commands, the hardware linked list queue may optionally not perform an operation in Step 1229. Although FIG. 12 shows particular types of commands, alternative or other types of commands may exist without departing from the invention.

In one or more embodiments of the invention, Steps 1213-1225 are shown as optional. Specifically, whether the steps are performed may be dependent on the type of module. For example, the DMA module may support peek commands while the virtual kick module does not support peek commands.

Figure 13:
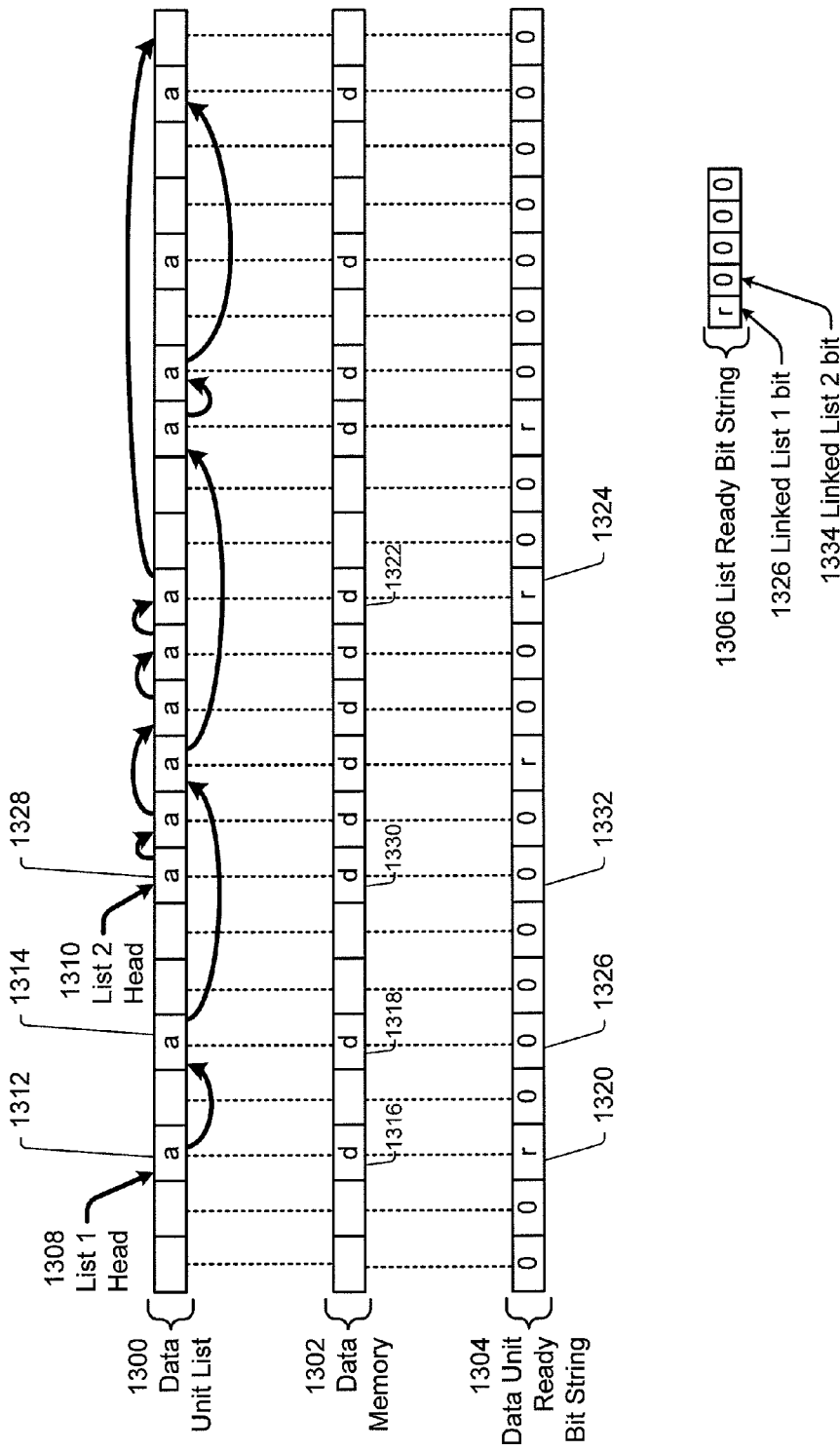
FIG. 13 shows an example in one or more embodiments of the invention.

FIG. 13 shows an example in one or more embodiments of the invention. The following example is for explanatory purposes only and not intended to limit the scope of the invention. FIG. 13 shows an example data unit list (1300), data memory (1302), data unit ready bit string (1304), and list ready bit string (1306) in one or more embodiments of the invention. In the example, dotted lines are used to represent correspondence between entries. For example, the first entry of the data unit list (1300) corresponds to first entry of the data memory (1302). In the example, there is a one-to-one mapping between entries in the data unit list (1300), entries in the data memory (1302), and bits in the data unit ready bit string (1304).

Continuing with the example, "a" is used to represent that the entry stores an address, "d" is used to represent that the entry stores a data unit, "r" is used to indicate that the entry indicates the ready bit is set, a "0" indicates that the data in the bit is reset, and an empty space indicates that it does not matter what the data is in the unit. Further, thick arrows represent the references between components. Thin arrows are used for reference characters. In the example, list 1 head references entry (1312). The address stored in entry (1312) is the address of entry (1314). Thus, entry (1316) in data memory (1302) is the first entry in linked list 1 and entry (1318) in data memory (1302) is the second entry in linked list 1. As shown in FIG. 13, the data unit list (1300) may be used to identify, for a particular linked list, the data units and the order of the data units in the linked list.

Continuing with the example, as shown by the data unit ready bit string (1304), some of the data units may be processed and ready for forwarding to the consumer while other data units are not processed. For example, entry (1316) is ready as shown by bit (1320). Additionally, entry (1322) is ready as shown by bit (1324). In one or more embodiments of the invention, entry (1322) may be ready before other entries in linked list 2 because, for example, no processing is required on entry (1322). In particular, if the module is a DMA module, and entry (1322) does not require DMA, then entry (1322) may be deemed immediately ready upon receipt by the DMA module. In other words, because DMA is not required by entry (1322), entry (1322) may be transmitted to the consumer as soon as entry (1322) is the first data unit in list 2.

In the example, the list ready bit string (1306) may be used to represent whether the list is ready. For example, as shown by bit (1326), linked list 1 is ready. Specifically, because the list 1 head pointer (1308) references entry (1312) corresponding to data unit (1316) that is ready as shown in bit (1320), linked list 1 is deemed ready for the first data unit to be popped and transmitted to the consumer. However, because the list 2 head pointer (1310) references entry (1328) corresponding to data unit (1330) that is not ready as shown in bit (1332), linked list 2 is not deemed ready for the first data unit to be popped and transmitted to the consumer. Accordingly, bit (1334) is not set. Because bit (1334) is not set, no data units in linked list 2 are removed from the data memory (1302).

In one or more embodiments of the invention, when a pop command is issued for linked list 1, list 1 head pointer is moved to reference entry (1314). Further, because entry (1314) corresponds to data unit in entry (1318) which is not ready as shown by bit (1336), the list 1 ready bit (1326) is reset in the list ready bit string (1306) after data unit (1316) is removed from list 1.

As shown by way of the example, embodiments of the invention provide a mechanism for supporting, in hardware, multiple linked lists in a single hardware linked list queue. Specifically, embodiments of the invention provide a mechanism for individually maintaining the ordering of forwarding data units in the same linked list while at the same time allowing data units in different linked lists to be processed out of order. Thus, for example, messages in the same queue pair are sent in order without having to wait for messages assigned to different queue pairs. Therefore, in one more embodiments of the invention, through the hardware linked list queue(s), the communications adapter supports resource sharing between processes executing on a host without having a single process block other processes from sending messages and using the resources of the host channel adapter.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for temporary storage of data units on a communications adapter, comprising:
   receiving a first data unit to store in a hardware linked list queue on the communications adapter, wherein the hardware linked list queue comprises a plurality of linked lists;
   reading a first index value from the first data unit;
   determining that the first index value does match an existing index value of a first linked list of the plurality of linked lists, wherein the first linked list comprises a first plurality of data units;
   storing the first data unit in the hardware linked list queue as a member of the first linked list;
   receiving a second data unit to store in the hardware linked list queue on the communications adapter;
   reading a second index value from the second data unit;
   determining that the second index value does not match any existing index value of any of the plurality of linked lists stored in the hardware linked list queue;
   allocating space in the hardware linked list queue for a second linked list to add the second linked list to the plurality of linked lists based on determining that the second index value does not match any existing index value;
   storing the second data unit in the second linked list; and
   for each transmission request of a plurality of transmission requests on the hardware linked list queue at least the following steps are performed:
      identifying a list identifier in the transmission request;
      identifying a head pointer of a requested linked list of the plurality of linked lists that matches the list identifier in the transmission request;
      obtaining, from the hardware linked list queue, a requested data unit referenced by the head pointer; and
      transmitting the requested data unit.

2. The method of claim 1, wherein storing the first data unit in the hardware linked list queue comprises:
   identifying, using a free list, an available entry in the hardware linked list queue;
   identifying, using a tail pointer, a previous tail entry in a data unit list,
   storing, in the previous tail entry, a reference to a next tail entry in the data unit list, wherein the next tail entry corresponds to the available entry in the hardware linked list queue;
   updating the tail pointer to reference the next tail entry; and
   storing the first data unit in the available entry of the hardware linked list queue.

3. The method of claim 1, further comprising:
   processing the first data unit in the hardware linked list queue; and
   setting a data unit ready bit corresponding to the first data unit in response to completing processing of the first data unit,
   wherein the data unit ready bit specifies that the first data unit is processed.

4. The method of claim 1, further comprising:
   processing a head data unit in the first linked list from the hardware linked list queue;
   setting a data unit ready bit corresponding to the head data unit in response to completing processing of the head data unit, wherein the data unit ready bit specifies that the head data unit is processed; and
   setting a list ready bit corresponding to the first linked list based on the data unit ready bit being set, wherein the list ready bit specifies that the head data unit is ready for sending to a consumer module.

5. The method of claim 1, further comprising:
   receiving a third data unit to store in the hardware linked list queue;
   reading the third index value from the third data unit;
   determining that an underlying function matching the third index value comprises a maximum allocated number of data units in the hardware linked list queue; and
   dropping the third data unit based on the determination that the underlying function comprises the maximum allocated number of data units.

6. The method of claim 1, wherein the plurality of transmission requests comprises at least one selected from a group consisting of a pop command and a peek command.

7. The method of claim 1, further comprising:
   receiving a flush command;
   identifying a list identifier in the flush command; and
   returning all entries of a requested linked list of the plurality of linked lists that matches the list identifier in the flush command to an available linked list for the hardware linked list queue.

8. A hardware linked list queue for temporary storage of data units on a communications adapter comprising:
   a data list component comprising:

a data memory comprising a plurality of memory locations for storing a plurality of linked lists, wherein each linked list of the plurality of linked lists comprises at least one data unit;

a data list memory comprising:
  a free list for storing a list of available memory locations in the data memory; and
  a data unit list comprising a plurality of list entries, wherein each list entry of the plurality of list entries corresponds to a memory location of the plurality of memory locations, and wherein each list entry of the plurality of list entries stores an identifier of a next list entry in a same linked list; and
  a data list controller for storing a head pointer for each list of the plurality of linked lists, wherein the head pointer references a first list entry in the data unit list; and a management unit operatively connected to the data list component and configured to:
  receive an inbound data unit; and
  send the list identifier corresponding to the inbound data unit to the data list controller to associate the inbound data unit with the linked list corresponding to the inbound data unit, wherein the data list component is configured, for each transmission request of a plurality of transmission requests, to perform at least the following:
  identify a list identifier in the transmission request;
  identify the head pointer of a requested linked list of the plurality of linked lists that matches the list identifier in the transmission request;
  obtain, from the data memory, a requested data unit referenced by the head pointer; and
  transmit the requested data unit.

9. The hardware linked list queue of claim 8, further comprising:
  a data unit ready component for storing a data unit ready bit string comprising a first plurality of bits, wherein each bit of the first plurality of bits corresponds to a distinct list entry in the data unit list, and wherein each bit of the first plurality of bits identifies whether processing is completed on a data unit corresponding to the distinct list entry.

10. The hardware linked list queue of claim 9, further comprising:
  a list ready component for storing a list ready bit string comprising a second plurality of bits, wherein each bit of the second plurality of bits corresponds to a distinct linked list of the plurality of linked lists, and wherein each bit of the second plurality of bits identifies whether processing is completed on a data unit corresponding to a first data unit of the distinct linked list.

11. The hardware linked list queue of claim 8, wherein communications adapter is a host channel adapter.

12. The hardware linked list queue of claim 8, further comprising:
  a list identifier to index memory configured to store a mapping between list identifiers and index values.

13. The hardware linked list queue of claim 8, further comprising:
  index to list identifier memory configured to store a mapping between index values and list identifiers.

14. The hardware linked list queue of claim 8, further comprising:
  an inbound credit storage configured to store a number of available entries in the free list.

15. The hardware linked list queue of claim 8, wherein the management component is further configured to send an entry unique identifier for the at least one data unit to a data unit processor, and wherein the data unit processor processes the at least one data unit.

16. The hardware linked list queue of claim 8, wherein the plurality of transmission requests are received from an arbitrator, wherein the arbitrator selects the requested linked list for transmitting the requested data unit.

17. A communications adapter comprising:
  a producer module;
  a consumer module; and
  a current module interposed between the producer module and the consumer module and configured to:
    receive, from the producer module, a first data unit to store in a hardware linked list queue on the communications adapter, wherein the hardware linked list queue comprises a plurality of linked lists;
    read a first index value from the first data unit;
    determine that the first index value does match an existing index value of a first linked list of the plurality of linked lists, wherein the first linked list comprises a first plurality of data units;
    store the first data unit in the hardware linked list queue as a member of the first linked list;
    receive, from the producer module, a second data unit to store in the hardware linked list queue on the communications adapter;
    read a second index value from the second data unit;
    determine that the second index value does not match any existing index value of any of the plurality of linked lists stored in the hardware linked list queue;
    allocate space in the hardware linked list queue for a second linked list to add the second linked list to the plurality of linked lists based on determining that the second index value does not match any existing index value;
    store the second data unit in the second linked list; and
    for each transmission request of a plurality of transmission requests on the hardware linked list queue at least the following steps are performed:
      identify a list identifier in the transmission request;
      identify a head pointer of a requested linked list of the plurality of linked lists that matches the list identifier in the transmission request;
      obtain, from the hardware linked list queue, a requested data unit referenced by the head pointer; and
      transmit, to the consumer module, the requested data unit.

18. The communications adapter of claim 17, wherein the communications adapter is a host channel adapter, and wherein the producer module, the current module, and the consumer module are each one selected from a group consisting of a collect buffer unit module, a virtual kick module, a queue pair fetch module, a DMA module, a packet builder module, a completion module, a packet receiver module, a receive module, a descriptor fetch module, a receive queue entry handler module, and a DMA validation module.

19. The communications adapter of claim 17, wherein the communications adapter is a host channel adapter, and wherein the host channel adapter comprises a collect buffer unit module, a virtual kick module, a queue pair fetch module, a DMA module, a packet builder module, a completion module, a packet receiver module, a receive module, a descriptor fetch module, a receive queue entry handler module, and a DMA validation module.

20. The communications adapter of claim 19, wherein the collect buffer unit module, the virtual kick module, the queue pair fetch module, the DMA module, the packet builder module, the completion module, the packet receiver module, the receive module, the descriptor fetch module, the receive queue entry handler module, and the DMA validation module each comprise a separate hardware linked list queue.

* * * * *

UNITED STATES PATENT AND TRADEMARK OFFICE
CERTIFICATE OF CORRECTION

PATENT NO. : 8,804,752 B2  
APPLICATION NO. : 13/149483  
DATED : August 12, 2014  
INVENTOR(S) : Manula et al.

Page 1 of 1

It is certified that error appears in the above-identified patent and that said Letters Patent is hereby corrected as shown below:

In the Specification

In column 5, line 34, delete "machine" and insert -- machine. --, therefor.

In column 6, line 26, delete "machine" and insert -- machine. --, therefor.

In column 6, line 66, delete "machine" and insert -- machine. --, therefor.

In column 8, line 6, delete "machine" and insert -- machine. --, therefor.

In column 8, line 9, delete "machine" and insert -- machine. --, therefor.

In column 8, line 18, delete "machine" and insert -- machine. --, therefor.

In column 13, line 22, delete "machine" and insert -- machine. --, therefor.

In column 14, line 8, delete "acknowlegement" and insert -- acknowledgement --, therefor.

In column 15, line 6, delete "may used" and insert -- may be used --, therefor.

In column 22, line 28, delete "machine" and insert -- machine. --, therefor.

In column 22, line 40, delete "machine" and insert -- machine. --, therefor.

In column 22, line 49, delete "machines" and insert -- machines. --, therefor.

Signed and Sealed this  
Nineteenth Day of May, 2015

Michelle K. Lee  
*Director of the United States Patent and Trademark Office*